United States Patent
Hu et al.

(10) Patent No.: US 11,837,942 B2
(45) Date of Patent: *Dec. 5, 2023

(54) TACTILE FEEDBACK MECHANISM

(71) Applicant: TDK TAIWAN CORP., Taoyuan (TW)

(72) Inventors: Chao-Chang Hu, Taoyuan (TW); Che-Wei Chang, Taoyuan (TW)

(73) Assignee: TDK TAIWAN CORP., Yangmei Taoyuan (TW)

(*) Notice: Subject to any disclaimer, the term of this patent is extended or adjusted under 35 U.S.C. 154(b) by 312 days.

This patent is subject to a terminal disclaimer.

(21) Appl. No.: 17/172,269

(22) Filed: Feb. 10, 2021

(65) Prior Publication Data
US 2021/0167662 A1  Jun. 3, 2021

Related U.S. Application Data

(63) Continuation of application No. 17/037,066, filed on Sep. 29, 2020, now Pat. No. 10,951,089, which is a
(Continued)

(51) Int. Cl.
*H02K 7/06* (2006.01)
*H02K 21/24* (2006.01)
(Continued)

(52) U.S. Cl.
CPC .............. *H02K 7/063* (2013.01); *H02K 1/27* (2013.01); *H02K 1/2795* (2022.01); *H02K 7/06* (2013.01);
(Continued)

(58) Field of Classification Search
CPC ........ H02K 7/063; H02K 11/215; H02K 1/27; H02K 1/2793; H02K 7/06; H02K 21/24; H02K 9/08
(Continued)

(56) References Cited

U.S. PATENT DOCUMENTS 8,410,642 B2    4/2013  Dong et al.
10,833,558 B2 * 11/2020  Hu .......................... H02K 21/24
(Continued)

FOREIGN PATENT DOCUMENTS

CN        201577015 U   9/2010
CN        104617734 A   5/2015
(Continued)

*Primary Examiner* — Jose A Gonzalez Quinones
(74) *Attorney, Agent, or Firm* — Muncy, Geissler, Olds & Lowe, P.C.

(57) ABSTRACT

The present disclosure provides a vibration device, including a stator, an eccentric wheel and an electromagnetic driving assembly. The eccentric wheel rotates around a rotating shaft relative to the stator. The electromagnetic driving assembly includes at least one magnetic element and an induction coil. The at least one magnetic element is disposed on the eccentric wheel. The induction coil corresponds to the magnetic element, and the induction coil is disposed on the stator. When a current is applied to the induction coil, the induction coil acts with the magnetic element to generate an electromagnetic force to drive the eccentric wheel to rotate around the rotating shaft, so that the vibration device generates a vibration. The rotating shaft is disposed on the stator.

19 Claims, 18 Drawing Sheets

Related U.S. Application Data continuation of application No. 15/830,068, filed on Dec. 4, 2017, now Pat. No. 10,833,558.

(60) Provisional application No. 62/431,556, filed on Dec. 8, 2016.

(51) Int. Cl.
| | | |
|---|---|---|
| *H02K 29/08* | (2006.01) | |
| *H02K 11/215* | (2016.01) | |
| *H02K 1/27* | (2022.01) | |
| *H02K 1/2795* | (2022.01) | |

(52) U.S. Cl.
CPC ........... *H02K 11/215* (2016.01); *H02K 21/24* (2013.01); *H02K 29/08* (2013.01)

(58) Field of Classification Search
USPC ..................................................... 310/51, 81
See application file for complete search history.

(56) References Cited

U.S. PATENT DOCUMENTS

| | | |
|---|---|---|
| 2011/0156500 A1 | 6/2011 | Dong et al. |
| 2012/0104875 A1 | 5/2012 | Park |
| 2012/0313459 A1 | 12/2012 | Zhang |
| 2016/0254736 A1 | 9/2016 | Jin et al. |
| 2018/0115230 A1 | 4/2018 | Mao et al. |
| 2019/0207498 A1 | 7/2019 | Mao et al. |

FOREIGN PATENT DOCUMENTS

| | | | |
|---|---|---|---|
| CN | 204886637 U | | 12/2015 |
| KR | 20100021987 A | * | 2/2010 |

* cited by examiner

TACTILE FEEDBACK MECHANISM

CROSS REFERENCE TO RELATED APPLICATIONS

The present application is a continuation application of the U.S. patent application Ser. No. 17/037,066, filed on Sep. 29, 2020, which is a continuation application of the U.S. patent application Ser. No. 15/830,068, filed on Dec. 4, 2017, which claims priority to U.S. Provisional Application No. 62/431,556 filed on Dec. 8, 2016, and China Patent Application No. 201711079442.X, filed Nov. 6, 2017, the entirety of which are incorporated by reference herein.

BACKGROUND OF THE DISCLOSURE

Field of the Disclosure

The present disclosure relates to a tactile feedback mechanism, and more particularly to a tactile feedback mechanism utilizing sensing coils and magnets to generate an electromagnetic force to generate vibration.

Description of the Related Art

As technology has progressed, many kinds of electronic devices, such as tablet computers and smartphones, have been produced to include a vibration notification function. When performing a specific function, such an electronic device can vibrate, through the use of a built-in vibration device, in order to notify a user. For example, when the electronic device receives a message or the user presses a button on the electronic device, the electronic device can vibrate to notify the user that the message has been received or that the button has been pressed successfully.

A current vibration module that is widely used utilizes a rotary motor to drive an eccentric member to generate the vibration. However, the rotary motor is a conventional DC brush motor, and the thickness of the vibration module with the DC brush motor cannot be decreased any further. In addition, the eccentric member is disposed outside of the rotary motor and connected to a rotating shaft of the rotary motor, which means that the length of the vibration module cannot be decreased any further. As a result, the size of the vibration module cannot be reduced any further. Furthermore, the vibration module composed of the rotary motor and the eccentric member can only provide a vibration in a single direction or on a plane.

Therefore, how to design a tactile feedback mechanism capable of providing at least two directions or achieving miniaturization is an important subject for further research and development.

BRIEF SUMMARY OF THE DISCLOSURE

Accordingly, one objective of the present disclosure is to provide a tactile feedback mechanism utilizing electromagnetic force, so as to solve the problems described above.

According to some embodiments of the disclosure, a tactile feedback mechanism is provided, and the tactile feedback mechanism includes a fixed portion, a first movable portion, a first driving assembly, a second movable portion, and a second driving assembly. The first movable portion is moved relative to the fixed portion. The first driving assembly drives the first movable portion to move along a first direction relative to the fixed portion. The second movable portion is moved relative to the fixed portion and the first movable portion. The second driving assembly drives the second movable portion to move along a second direction relative to the fixed portion. The first direction and the second direction are different. The first movable portion and the second movable portion do not interfere with their respective movements.

In some embodiments, The tactile feedback mechanism further includes a first resilient element and a second resilient element. The first resilient element is connected the fixed portion and the first movable portion. The second resilient element is connected the fixed portion and the second movable portion.

In some embodiments, the tactile feedback mechanism further includes another first resilient element. The two first resilient elements are connected to opposite sides of the first movable portion, and the two first resilient elements are disposed along the first direction.

In some embodiments, the tactile feedback mechanism further includes another second resilient element. The two second resilient elements are connected to opposite sides of the second movable portion, and the two second resilient elements are disposed along the second direction.

In some embodiments, the first driving assembly includes a first magnetic element and a first induction coil corresponding to the first magnetic element. The first induction coil acts with the first magnetic element to drive the first movable portion to move along the first direction.

In some embodiments, the first driving assembly further includes other three first magnetic elements, and the four first magnetic elements are arranged in the first direction, two of the four first magnetic elements are disposed on a side of the first movable portion, other two of the four first magnetic elements are disposed on an opposite side of the first movable portion.

In some embodiments, the first driving assembly further includes other three first induction coils, and two of the four first induction coils are disposed on a side of the fixed portion, other two of the four first induction coils are disposed on an opposite side of the fixed portion.

In some embodiments, the second driving assembly includes a second magnetic element and a second induction coil corresponding to the second magnetic element. The second induction coil acts with the second magnetic element to drive the second movable portion to move along the second direction.

In some embodiments, the second driving assembly further includes other three second magnetic elements, and the four second magnetic elements are arranged in the second direction, two of the four second magnetic elements are disposed on a side of the second movable portion, other two of the four second magnetic elements are disposed on an opposite side of the second movable portion.

In some embodiments, the second driving assembly further includes other three second induction coils, and two of the four second induction coils are disposed on a side of the fixed portion, other two of the four second induction coils are disposed on an opposite side of the fixed portion.

In some embodiments, a first opening is formed on the first movable portion, and the second movable portion is disposed in the first opening.

In some embodiments, the first movable portion and the second movable portion are arranged in a third direction, and the third direction is substantially perpendicular to the first direction or the second direction.

In some embodiments, the tactile feedback mechanism further includes a third movable portion and a third driving assembly. The third driving assembly drives the third movable portion to move along a third direction relative to the fixed portion. The first direction, the second direction and the third direction are different.

In some embodiments, third driving assembly includes a third magnetic element and a third induction coil corresponding to the third magnetic element. The third induction coil acts with the third magnetic element to drive the third movable portion to move along the third direction.

In some embodiments, the third induction coil has a ring structure which surrounds a portion of the third movable portion, and the third magnetic element has a ring structure which surrounds the third induction coil.

In some embodiments, the third induction coil is disposed on the fixed portion, and the third magnetic element is disposed on the third movable portion.

In some embodiments, the tactile feedback mechanism further includes a third resilient element. The third resilient element is disposed between the third movable portion and the fixed portion.

In some embodiments, the third resilient element has an inner ring portion and an outer ring portion, the inner ring portion is connected to the third movable portion, and the outer ring portion is connected to the fixed portion.

In some embodiments, the tactile feedback mechanism further includes another third resilient element. The another third resilient element has an inner ring portion and an outer ring portion, the inner ring portion is connected to the third magnetic element, and the outer ring portion is connected to the fixed portion, and the two third resilient elements are disposed along the third direction.

In some embodiments, the first movable portion, the second movable portion, and the third movable portion do not interfere with their respective movements.

In conclusion, the present disclosure provides a vibration device that includes a stator, an eccentric wheel, and an electromagnetic driving assembly. Because the eccentric wheel and the electromagnetic driving assembly are disposed in the stator and on the same plane, the thickness of the vibration device can be decreased so as to achieve the purpose of miniaturization. In some embodiments, the present disclosure further provides a vibration device which can generate a vibration in single direction, generate vibrations in two directions generated independently or simultaneously, and generate vibrations in three directions, so that when the vibration device of the disclosure is installed in an electronic device (such as a smartphone or a tablet computer), a user can be notified of different messages by the different vibrations.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

Figure 1:
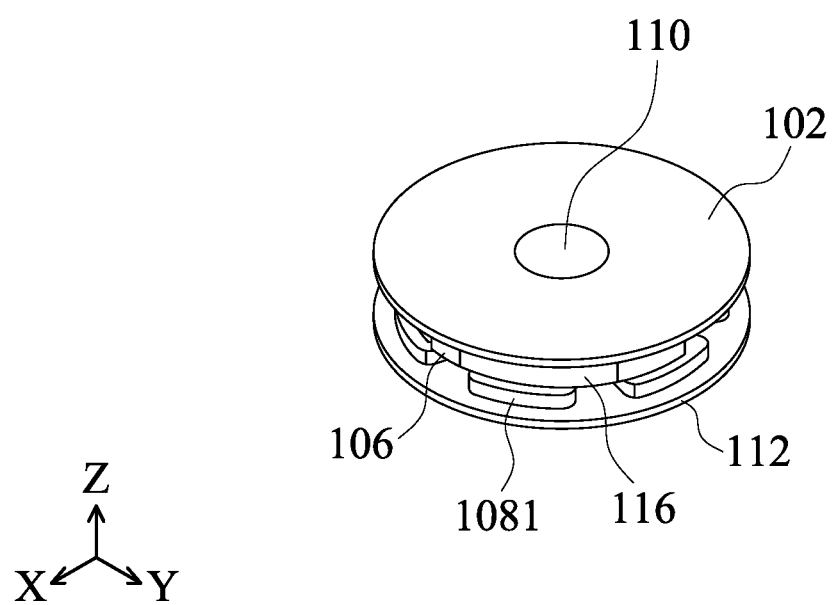
FIG. 1 is a schematic diagram of a vibration device according to an embodiment of the disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
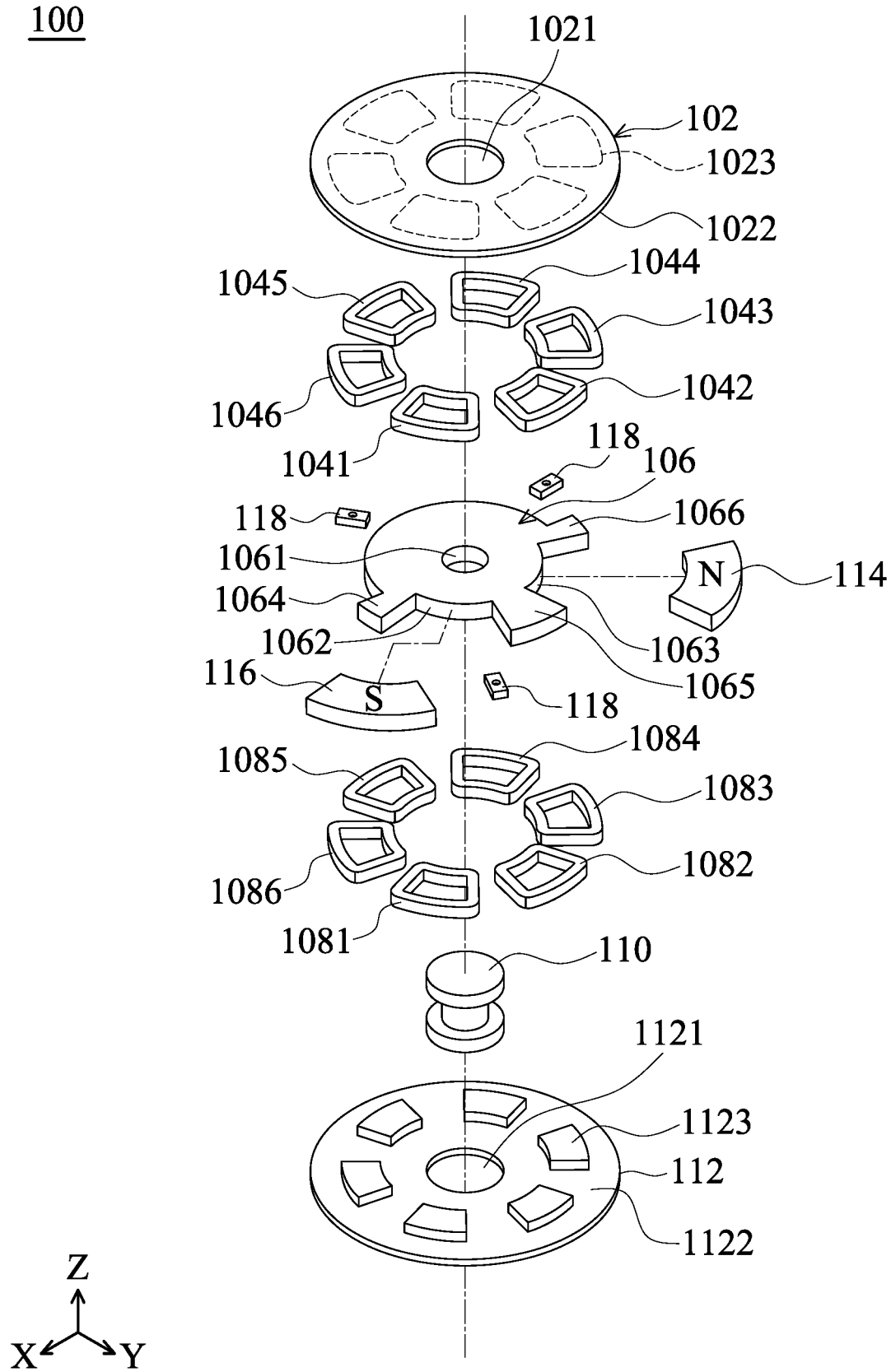
FIG. 2 is an exploded diagram of the vibration device in FIG. 1.

Please refer to FIG. 1 and FIG. 2. FIG. 1 is a schematic diagram of a vibration device 100 according to an embodiment of the disclosure, and FIG. 2 is an exploded diagram of the vibration device 100 in FIG. 1 according to the embodiment of the disclosure. As shown in FIG. 1 and FIG. 2, the vibration device 100 includes a upper fixed member 102, a plurality of upper induction coils, at least one magnetic element, an eccentric wheel 106, a plurality of lower induction coils, a rotating shaft 110 and lower fixed member 112. In this embodiment, the upper fixed member 102 and the lower fixed member 112 can be defined as a stator of the vibration device 100. The upper fixed member 102 and the lower fixed member 112 respectively include an upper opening 1021 and a lower opening 1121. The eccentric wheel 106 includes a central opening 1061, and the rotating shaft 110 is disposed through the central opening 1061, the upper opening 1021 and the lower opening 1121 and is disposed on the upper fixed member 102 and the lower fixed member 112 through a bearing structure (not shown in the figures). As a result, the eccentric wheel 106 can be driven by the rotating shaft 110 to rotate around the Z-axis relative to the upper fixed member 102 and the lower fixed member 112.

In this embodiment, the upper induction coils, the lower induction coils and at least one magnetic element can be defined as an electromagnetic driving assembly of the vibration device 100. The vibration device 100 further includes a first magnetic element 114 and a second magnetic element 116, and the eccentric wheel 106 further includes a first slot 1062, a second slot 1063, a protruding portion 1064, a protruding portion 1065 and a protruding portion 1066. The first slot 1062 is formed between the protruding portion 1064 and the protruding portion 1065, and the second slot 1063 is formed between the protruding portion 1065 and the protruding portion 1066. The first slot 1062 and the second slot 1063 are for accommodating the second magnetic element 116 and the first magnetic element 114, respectively. In this embodiment, when the first magnetic element 114 and the second magnetic element 116 are disposed on the eccentric wheel 106, the magnetic pole directions of the first magnetic element 114 and the second magnetic element 116 are parallel to the direction of the rotating shaft 110 (i.e. parallel to the Z-axis). The North pole of the first magnetic element 114 and the South pole of the second magnetic element 116 face the upper fixed member 102, and the South pole of the first magnetic element 114 and the North pole of the second magnetic element 116 face the lower fixed member 112. In some embodiments, the first magnetic element 114 and the second magnetic element 116 can be multipole magnets. In addition, it should be noted that the protruding portion 1064, the protruding portion 1065 and the protruding portion 1066, the first magnetic element 114 and the second magnetic element 116 can constitute a fan-shaped structure.

As shown in FIG. 2, the upper fixed member 102 and the lower fixed member 112 respectively have a disk-shaped structure. The upper fixed member 102 includes a lower surface 1022, and six protruding portions 1023 are formed on the lower surface 1022. The lower fixed member 112 includes an upper surface 1122, and six protruding portions 1123 corresponding to the six protruding portions 1023 are formed on the upper surface 1122. The lower surface 1022 and the upper surface 1122 face the eccentric wheel 106. In this embodiment, the vibration device 100 includes six upper induction coils 1041~1046 and six lower induction coils 1081~1086. The upper induction coils 1041~1046 are respectively disposed on the protruding portions 1023, and the lower induction coils 1081~1086 are respectively disposed on the protruding portions 1123 on the upper surface 1122. In this embodiment, the upper induction coils 1041~1046 and the lower induction coils 1081~1086 are disposed corresponding to the first magnetic element 114 and the second magnetic element 116.

Figure 3:
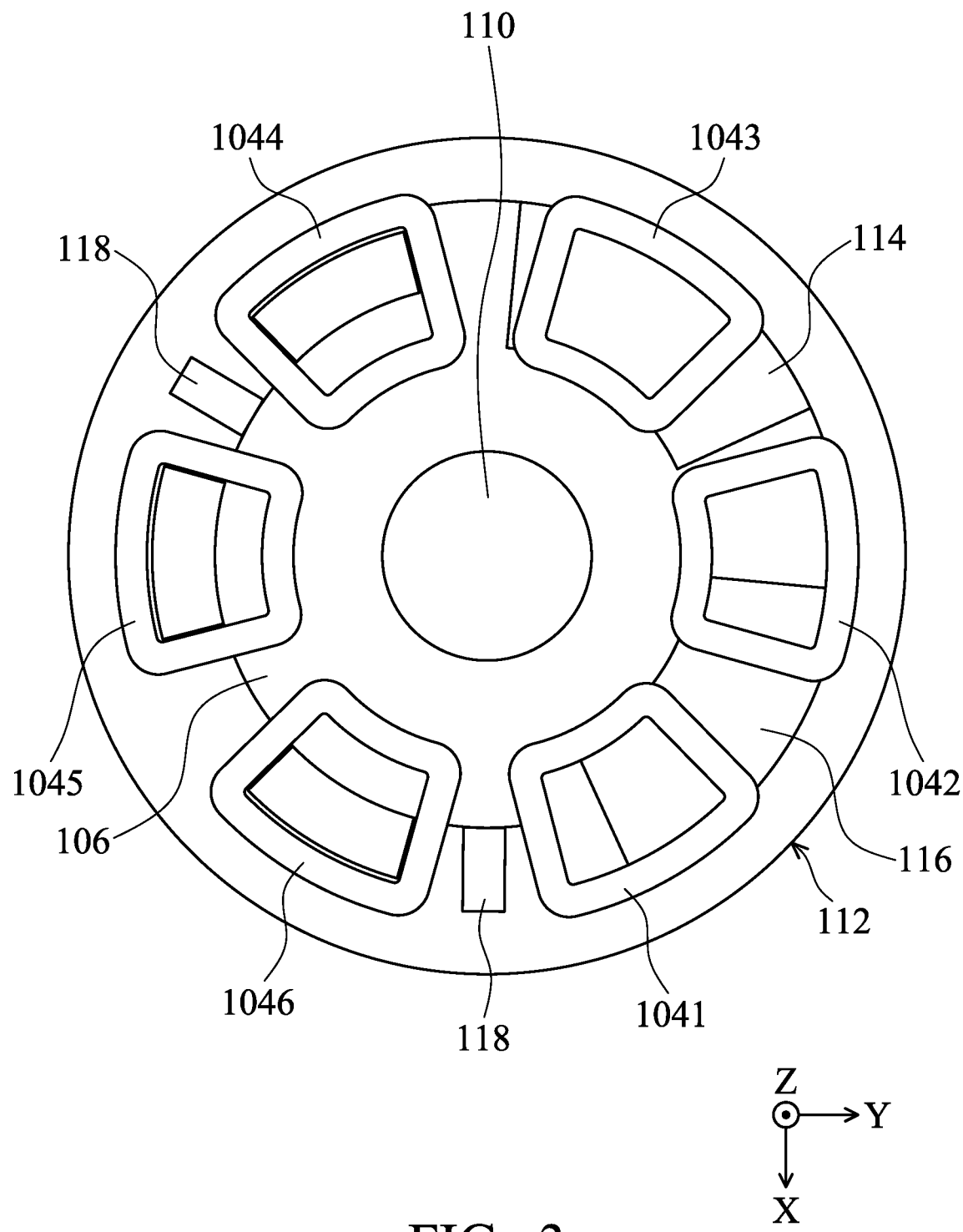
FIG. 3 is a top view of the vibration device in FIG. 1 after removing the upper fixed member.

Please refer to FIG. 2 and FIG. 3. FIG. 3 is a top view of the vibration device 100 in FIG. 1 after removing the upper fixed member 102 according to the embodiment of the disclosure. As shown in FIG. 3, an initial position of the first magnetic element 114 can be between the upper induction coil 1042 and upper induction coil 1043, and an initial position of the second magnetic element 116 can be between upper induction coil 1041 and the upper induction coil 1042. When a current is applied to the upper induction coils 1041~1046 and the lower induction coils 1081~1086 (the lower induction coils 1081~1086 are not shown in FIG. 3 due to the angle of view), the upper induction coils 1041~1046 and the lower induction coils 1081~1086 respectively act with the first magnetic element 114 and the second magnetic element 116 to generate the electromagnetic force, so as to drive the eccentric wheel 106 to rotate around the rotating shaft 110. In particular, as the example in FIG. 2 and FIG. 3, the upper induction coil 1041 and the lower induction coil 1081 are respectively act with the second magnetic element 116 to generate an magnetic rejection force, the upper induction coil 1042 and the lower induction coil 1082 respectively act with the second magnetic element 116 to generate a magnetic attraction force, and the upper induction coil 1043 and the lower induction coil 1083 respectively act with the first magnetic element 114 to generate a magnetic rejection force, so as to drive the first magnetic element 114, the second magnetic element 116 and the eccentric wheel 106 to rotate counterclockwise around the Z-axis. It should be noted that the current applied to the upper induction coils 1041~1046 and the lower induction coils 1081~1086 can be a direct current or an alternating current, and the phase of each current which is applied to the upper induction coils 1041~1046 and the lower induction coils 1081~1086 can be the same or different.

Because the center of gravity of the first magnetic element 114, the second magnetic element 116 and the eccentric wheel 106 is deviated from the rotating shaft 110 to the fan-shaped structure and is not on the rotating shaft 110, when the first magnetic element 114, the second magnetic element 116 and the eccentric wheel 106 rotate around the rotating shaft 110, the rotation of the first magnetic element 114, the second magnetic element 116 and the eccentric wheel 106 causes the vibration device 100 to generate a vibration along the XY plane. In addition, the vibration device 100 can further include a position sensor 118 (sensing element), configured to sense the position of the eccentric wheel 106 when rotating. As shown in FIG. 2, the vibration device 100 includes three position sensors 118, which are disposed on the lower fixed member 112 and located between two protruding portions 1123.

It should be noted that the eccentric wheel 106 served as a rotor of the vibration device 100 is disposed between the upper fixed member 102 and the lower fixed member 112, so that this design can decrease the thickness of the vibration device 100 along the Z-axis, so as to achieve the purpose of miniaturization.

Figure 4:
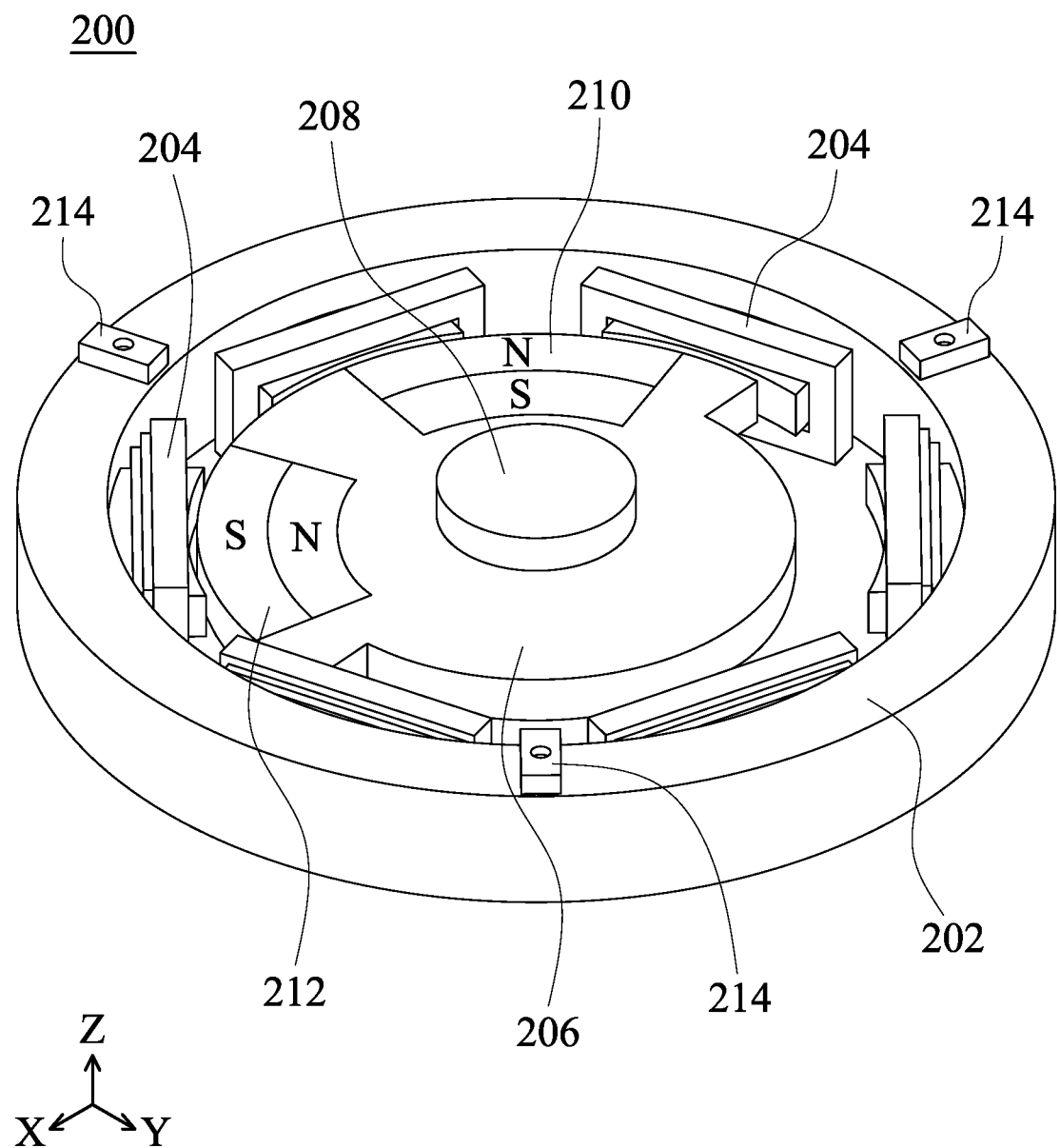
FIG. 4 is a diagram of a vibration device according to another embodiment of the disclosure.
Figure 5:
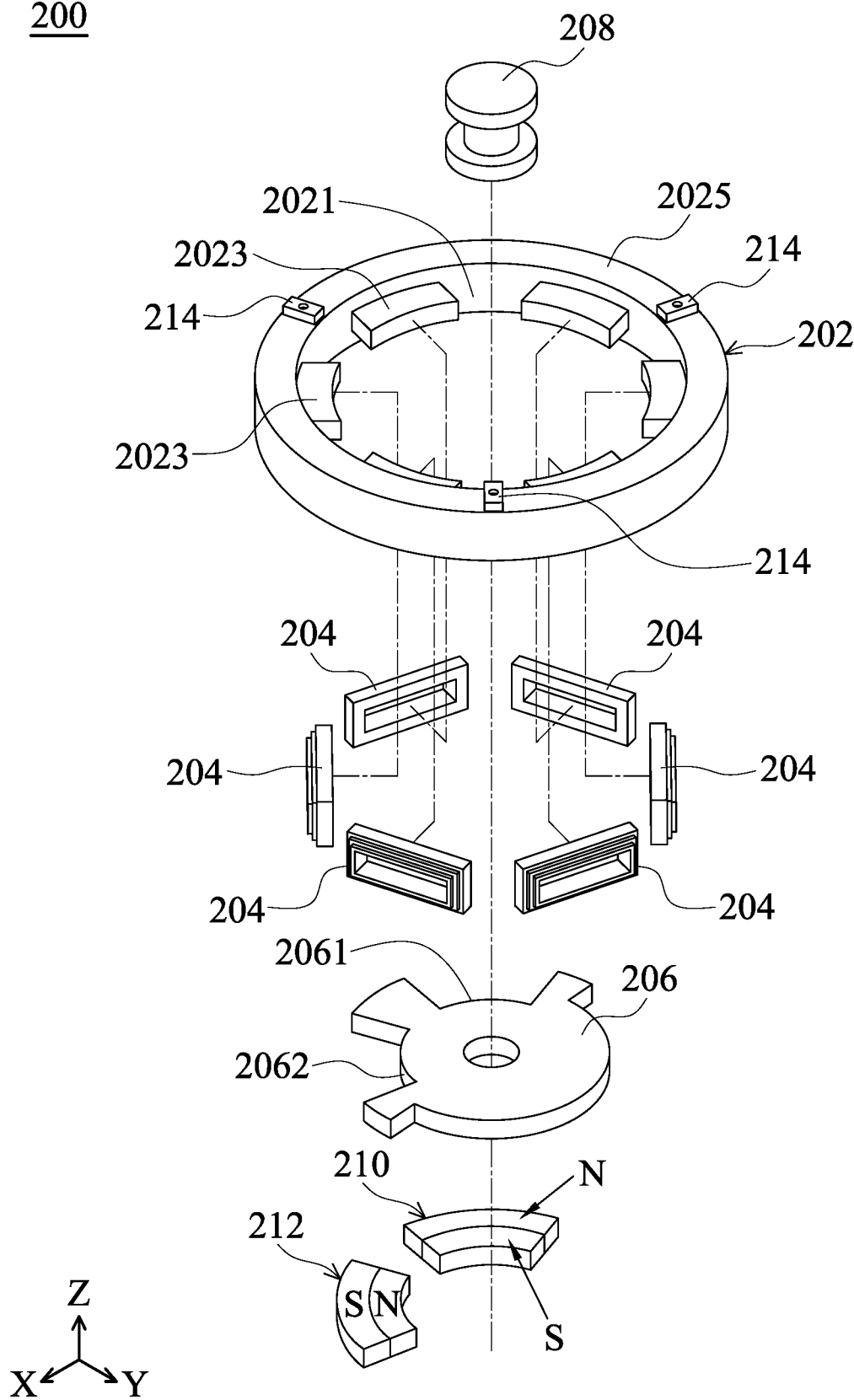
FIG. 5 is an exploded diagram of the vibration device according to another embodiment of the disclosure.

Please refer to FIG. 4 and FIG. 5. FIG. 4 is a diagram of a vibration device 200 according to another embodiment of the disclosure. FIG. 5 is an exploded diagram of the vibration device 200 according to another embodiment of the disclosure. In this embodiment, the vibration device 200 includes a stator 202, a plurality of induction coils 204, an eccentric wheel 206, a rotating shaft 208, a third magnetic element 210 and a fourth magnetic element 212. In this embodiment, the stator 202 has a ring structure, an inner surface 2021 and a plurality of protruding portion 2023 formed on the inner surface 2021. The induction coils 204 correspond to the third magnetic element 210 and the fourth magnetic element 212, and the induction coils 204 are disposed on the protruding portion 2023 of the inner surface 2021.

Similar to the previous embodiment, the third magnetic element 210 and the fourth magnetic element 212 can be installed in a first slot 2061 and a second slot 2062 of the eccentric wheel 206, and the eccentric wheel 206 can rotate around the rotating shaft 208. It should be noted that the magnetic pole directions of the third magnetic element 210 and the fourth magnetic element 212 are radially perpendicular to the direction of the rotating shaft 208 (the direction along the Z-axis), as shown in FIG. 4. More specifically, the North pole of the third magnetic element 210 faces the stator 202 and the South pole of the third magnetic element 210 faces the rotating shaft 208. Comparatively, the South pole of the fourth magnetic element 212 faces the stator 202, and the North pole of the fourth magnetic element 212 faces the rotating shaft 208. When the induction coils 204 are supplied with electricity, the induction coils 204 respectively acts with the third magnetic element 210 and the fourth magnetic element 212 to generate the electromagnetic force, so as to drive the third magnetic element 210, the fourth magnetic element 212 and the eccentric wheel 206 to rotate around the rotating shaft 208. Because the center of gravity of the third magnetic element 210, the fourth magnetic element 212 and the eccentric wheel 206 is deviated from the rotating shaft 208, when the eccentric wheel 206 rotates, the rotation causes the vibration device 200 to generate a vibration along the XY plane.

In addition, the vibration device 200 can include at least one sensing element 214. As shown in FIG. 5, the vibration device 200 includes three sensing elements 214, disposed on an upper surface 2025 of the stator 202, but the position and the number of the sensing element 214 are not limited thereto. For example, the sensing element 214 can also be disposed between two protruding portions 2023 on the inner surface 2021. It should be noted that the induction coils 204, the eccentric wheel 206, the third magnetic element 210 and the fourth magnetic element 212 are all located on the same plane (the XY plane), so that the thickness of the vibration device 200 along the Z-axis in this embodiment can be decreased further, so as to achieve the purpose of miniaturization.

Figure 6:
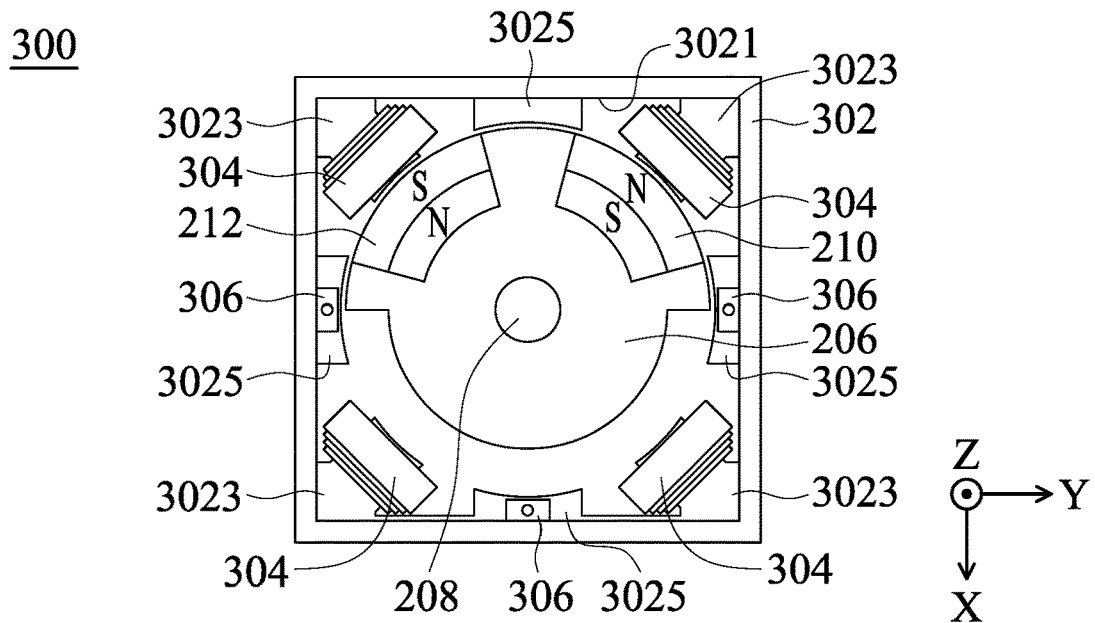
FIG. 6 is a top view of a vibration device according to another embodiment of the disclosure.

Please refer to FIG. 6, which is a top view of a vibration device 300 according to another embodiment of the disclosure. The vibration device 300 in this embodiment is similar to the vibration device 200 in FIG. 4, and the difference between these two vibration devices is that a stator 302 of the vibration device 300 in this embodiment has a frame structure. As shown in FIG. 6, the stator 302 includes an inner surface 3021, and four first protruding portions 3023 are formed on the inner surface 3021 and located at four corners of the stator 302.

In addition, the vibration device 300 can include the eccentric wheel 206, the rotating shaft 208, the third magnetic element 210, the fourth magnetic element 212 and four induction coils 304. The induction coils 304 are respectively disposed on the first protruding portions 3023 and face the eccentric wheel 206. Similarly, the North pole of the third magnetic element 210 faces the stator 202 and the South pole of the third magnetic element 210 faces the rotating shaft 208, and the South pole of the fourth magnetic element 212 faces the stator 202 and the North pole of the fourth magnetic element 212 faces the rotating shaft 208. When the induction coils 304 are supplied with electricity, the induction coils 304 respectively acts with the third magnetic element 210 and the fourth magnetic element 212 to generate the electromagnetic force, so as to drive the third magnetic element 210, the fourth magnetic element 212 and the eccentric wheel 206 to rotate around the rotating shaft 208. Because the center of gravity of the third magnetic element 210, the fourth magnetic element 212 and the eccentric wheel 206 is deviated from the rotating shaft 208, when the eccentric wheel 206 rotates, the rotation causes the vibration device 300 to generate a vibration along the XY plane.

Furthermore, as shown in FIG. 6, there can be four second protruding portions 3025 formed on the inner surface 3021 of the stator 302, and the four second protruding portions 3025 are located on four sides of the stator 302. The vibration device 300 can include at least one sensing element 306 for sensing the position of the eccentric wheel 206 when rotating. In this embodiment, the vibration device 300 includes three sensing elements 306, respectively disposed on three second protruding portions 3025, and each of the sensing elements 306 is located between two adjacent induction coils 304. It is noted that the sensing element 306 can also be disposed on the inner surface 3021 in other embodiments.

Because the electromagnetic driving assembly and the eccentric wheel 206 are positioned on the same plane (the XY plane), the thickness of the vibration device 300 along the Z-axis can also be decreased.

Figure 7:
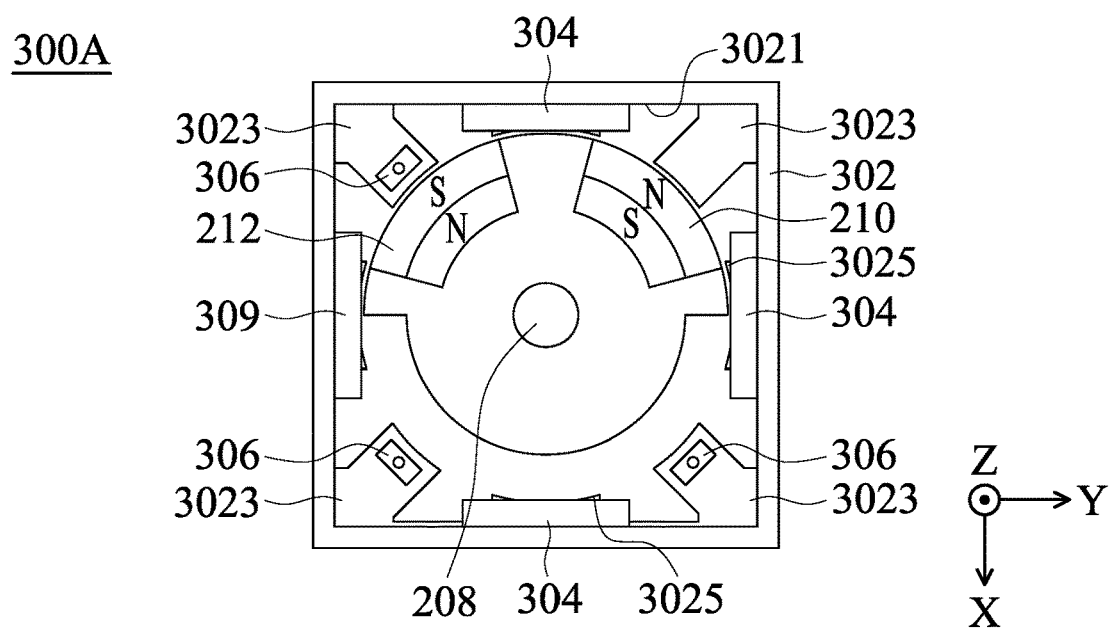
FIG. 7 is a top view of a vibration device according to another embodiment of the disclosure.

Please refer to FIG. 7, which is a top view of a vibration device 300A according to another embodiment of the disclosure. The vibration device 300A is similar to the vibration device 300 in the previous embodiment, and the difference between these two vibration devices is that the four induction coils 304 are respectively disposed on the second protruding portions 3025 of the four sides and face the eccentric wheel 206, and the three sensing elements 306 are disposed on the three first protruding portions 3023 in this embodiment. The positions of the induction coils 304 and the sensing elements 306 depend on practical design requirements. For example, the sensing element 306 can also be disposed on the inner surface 3021. The driving mechanism of the vibration device 300A is similar to that of the previous embodiment, and the description is therefore omitted herein.

Figure 8:
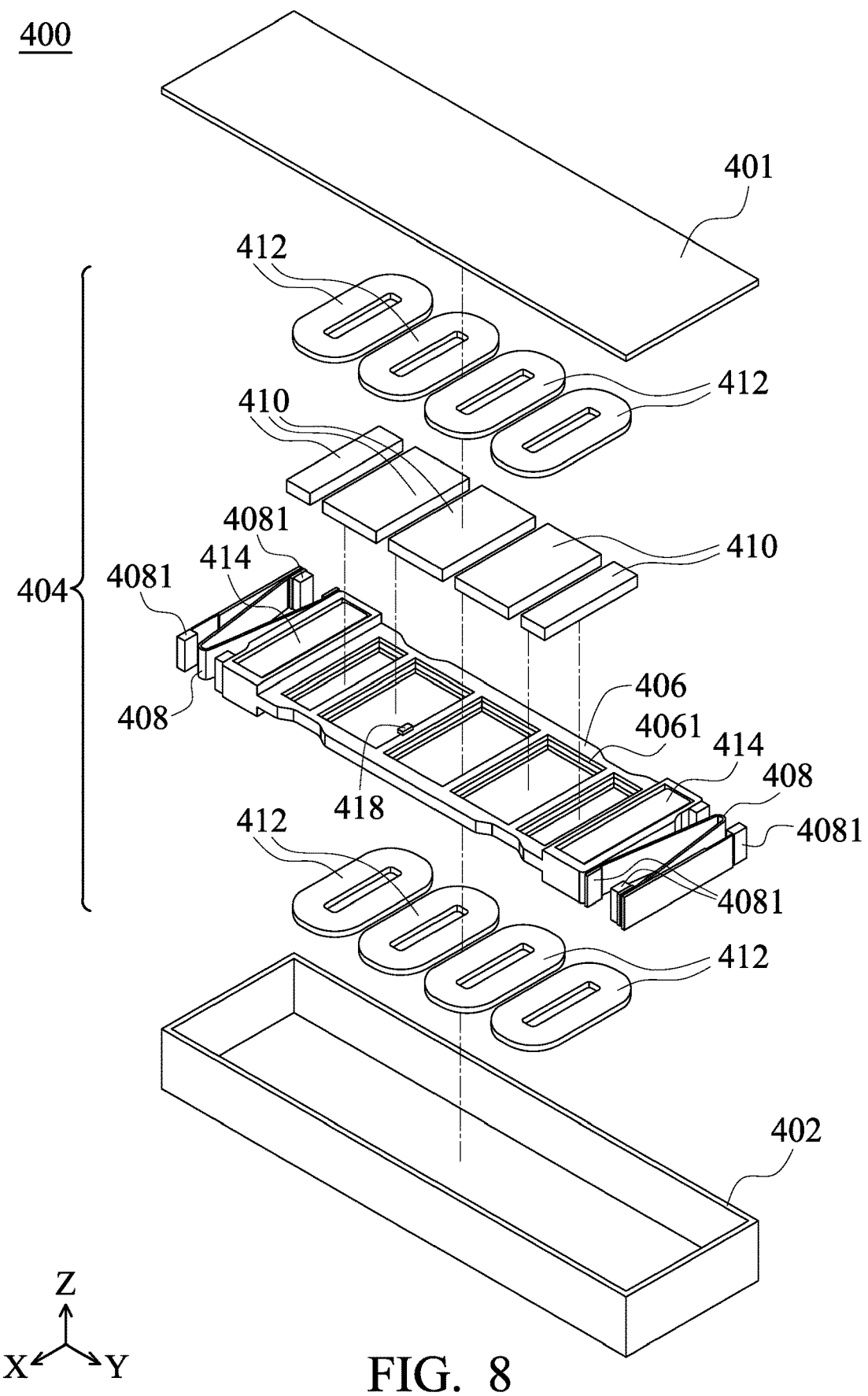
FIG. 8 is an exploded diagram of a vibration device according to another embodiment of the disclosure.
Figure 9:
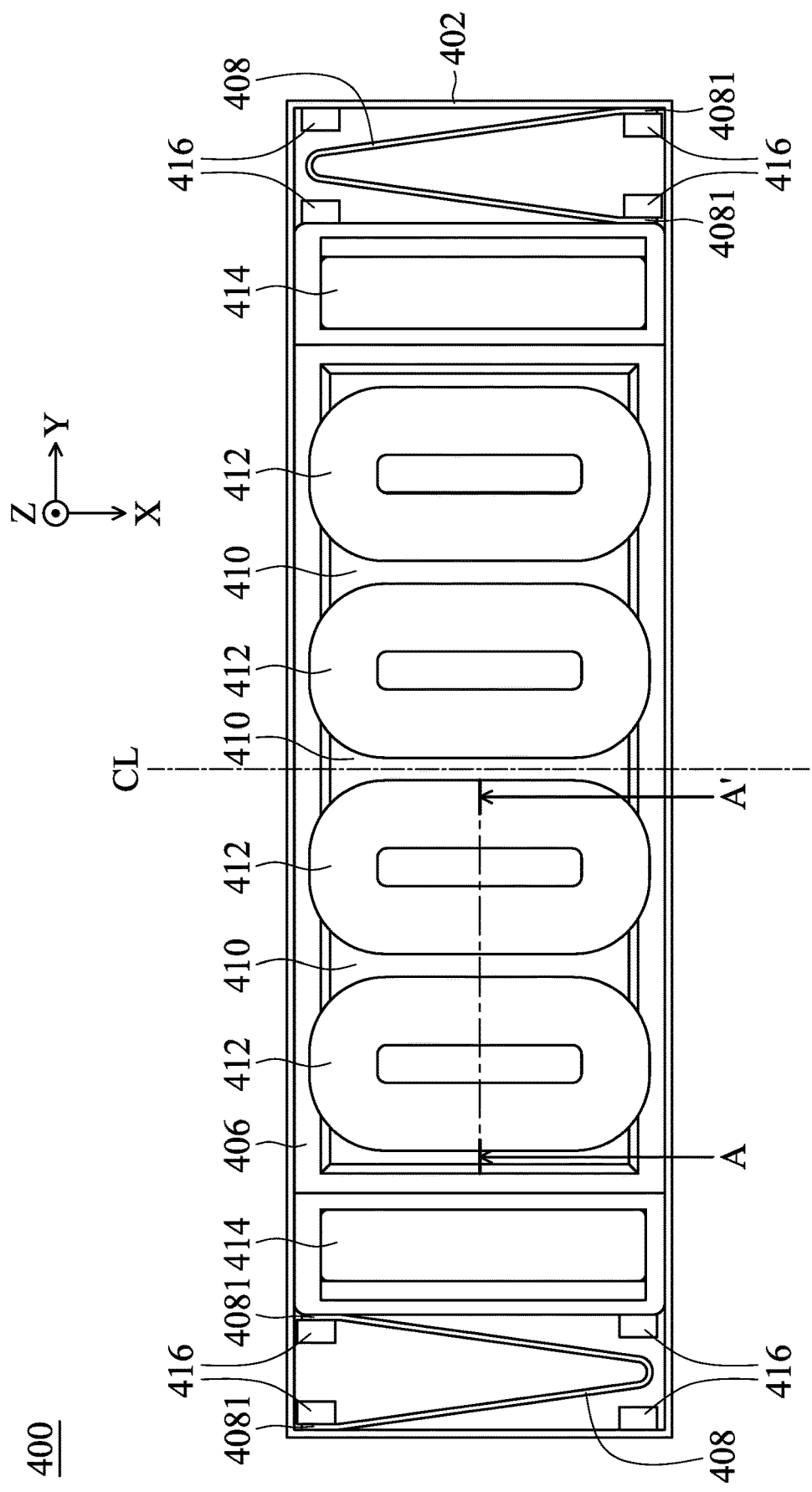
FIG. 9 is a top view illustrating that a first vibration module is disposed on a fixed portion according to another embodiment of the disclosure.

Please refer to FIG. 8 and FIG. 9. FIG. 8 is an exploded diagram of a vibration device 400 according to another embodiment of the disclosure, and FIG. 9 is a top view of FIG. 8 illustrating that a first vibration module 404 is disposed on a fixed portion 402. As shown in FIG. 8, the vibration device 400 includes a cover 401, the fixed portion 402 and the first vibration module 404. The first vibration module 404 is disposed inside the fixed portion 402, and the cover 401 is fixed to the fixed portion 402. The first vibration module 404 can include a first movable member 406, at least one first resilient element 408, at least one first magnetic element 410 and at least one first induction coil 412. In this embodiment, the first vibration module 404 can include two first resilient elements 408, five first magnetic elements 410 and eight first induction coils 412.

As shown in FIG. 8 and FIG. 9, the first movable member 406 has a rectangular structure, and a plurality of installing slots 4061 corresponding to the first magnetic elements 410 are formed on the first movable member 406 for accommodating the first magnetic elements 410. The North poles of the first, third and fifth first magnetic elements 410 extend toward the −Z-axis, and the North poles of the second and fourth first magnetic elements 410 extend toward the Z-axis. The two first resilient element 408 are arranged along the Y-axis and are located two opposite sides of the first movable member 406, and the first resilient elements 408 are configured to connect the first movable member 406 to the fixed portion 402. It should be noted that the first movable member 406 are suspended in the fixed portion 402 by the two first resilient elements 408, and the first movable member 406 is not in contact with the fixed portion 402. In addition, as shown in FIG. 9, the two first resilient elements 408 are connected to two opposite sides of the first movable member 406, and the two first resilient elements 408 are disposed in different directions. That is, the fixed portion 402 can define a central line CL perpendicular to the Y-axis (first axial direction), and the two first resilient elements 408 are rotational symmetry relative to the central line CL.

As shown in FIG. 8, the four first induction coils 412 are disposed above the first movable member 406 and are securely disposed on the cover 401. The other four first induction coils 412 are disposed below the first movable member 406 and are securely disposed inside the fixed portion 402.

As shown in FIG. 9, the first magnetic elements 410 and the first induction coils 412 are disposed in a staggered manner. When the first induction coils 412 are supplied with electricity, the first induction coils 412 act with the first magnetic elements 410 to generate the electromagnetic force, so as to drive the first movable member 406 to move along the Y-axis (the first axis direction). Because the first induction coils 412 receive the alternating current, the direction of the electromagnetic force continuously changes, so that the first movable member 406 repeatedly moves rightward and leftward in the fixed portion 402 along the Y-axis, causing a vibration of the vibration device 400 along the Y-axis.

In addition, the vibration device 400 can further include two weight blocks 414 and a plurality of gels 416, configured to adjust a resonant frequency when the vibration device 400 vibrates. In this embodiment, the two weight blocks 414 are symmetrically disposed on two opposite sides of the first movable member 406. As shown in FIG. 9, the gel 416 can be disposed between the first movable member 406 and the first resilient element 408 or disposed between the fixed portion 402 and the first movable member 406. The gel 416 is not only configured to adjust the resonant frequency of the vibration device 400, but also has a cushion function. For achieve the effect of cushion, the gel 416 can also be disposed between a bottom portion 4081 of the first resilient element 408, or disposed between the first magnetic element 410 and the fixed portion 402. Positions of the gels 416 are not limited to the present disclosure.

Furthermore, the vibration device 400 can also include at least one sensing element 418, disposed on the first movable member 406, and the sensing element 418 is configured to sense a position of the first movable member 406 relative to the fixed portion 402. Specifically, in this embodiment, the sensing element 418 is disposed between two first magnetic elements 410 (as shown in FIG. 8). Based on the structural design of this embodiment, the vibration device 400 can provides a vibration in the Y-axis, and the thickness of the vibration device 400 along the Z-axis can also be decreased.

Figure 10:
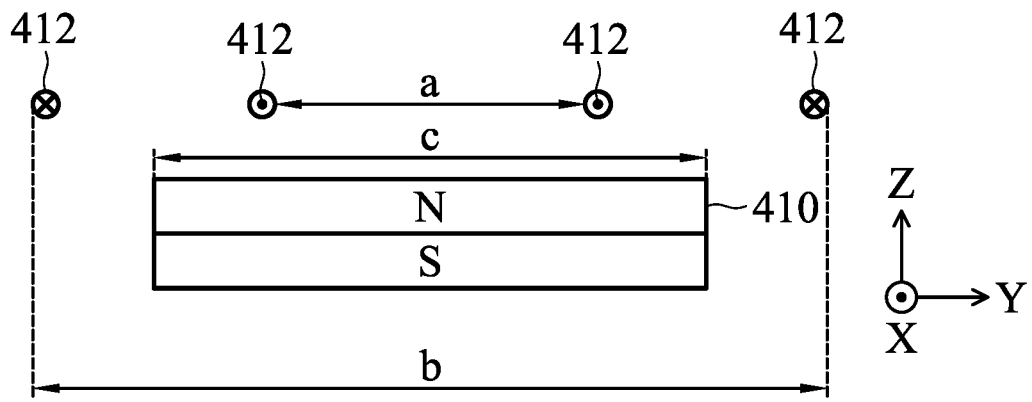
FIG. 10 is a sectional view of the first magnetic element and the first induction coil along the line A-A'.

Please refer to FIG. 10, which is a sectional view of the first magnetic element 410 and the first induction coil 412 along the line A-A' in FIG. 9 according to the embodiment of the disclosure. For convenience of description, only one first magnetic element 410 and two adjacent first induction coils 412 are shown in FIG. 10. The first magnetic element 410 has a width c along the Y-axis (the first axial direction), and a minimum distance a and a maximum distance b are formed between the two first induction coils 412. The first magnetic element 410 is disposed between the two adjacent first induction coils 412, and the width c of the first magnetic element 410 is greater than the minimum distance a and is less than the maximum distance b.

Figure 11:
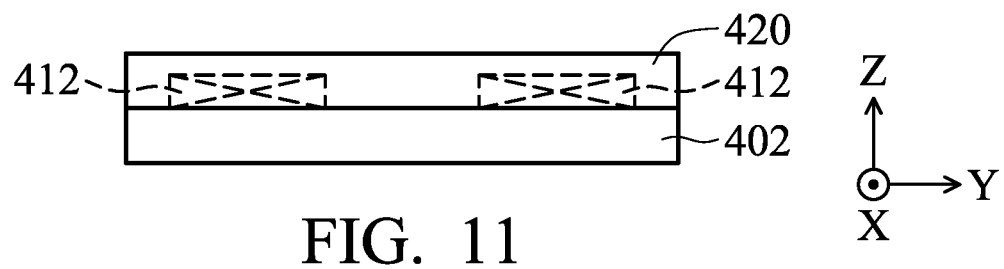
FIG. 11 is a diagram of the fixed portion and a circuit board according to another embodiment of the disclosure.

Please refer to FIG. 11, which is a diagram of the fixed portion 402 and a circuit board 420 according to another embodiment of the disclosure. In this embodiment, the vibration device (such as the vibration device 400 in FIG. 8) can further include the circuit board 420, disposed on the fixed portion 402, and the first induction coils 412 can be disposed inside the circuit board 420 (the circuit board 420 and the first induction coils 412 can constitute a plate coil). Because there can be fewer turns of the plate coil, the thickness of the plate coil can be smaller, and the thickness of the vibration device (such as the vibration device 400 in FIG. 8) along the Z-axis can be decreased further.

Figure 12:
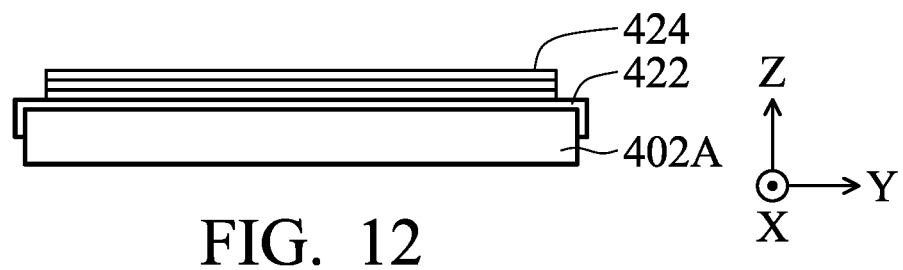
FIG. 12 is a structural diagram of a fixed portion according to another embodiment of the disclosure.

Please refer to FIG. 12, which is a structural diagram of a fixed portion 402A according to another embodiment of the disclosure. In this embodiment, the fixed portion 402A can be a metal member, and the vibration device (such as the vibration device 400 in FIG. 8) can further include an insulation layer 422 and a plurality of conductive layers 424. The insulation layer 422 is disposed between the conductive layers 424 and the fixed portion 402A. It should be noted that the conductive layers 424 can constitute an induction coil (such as the first induction coil 412), and the induction coil which is constituted by the conductive layers 424 has a smaller thickness along the Z-axis, so that the thickness of the vibration device along the Z-axis can be decreased further.

Figure 13:
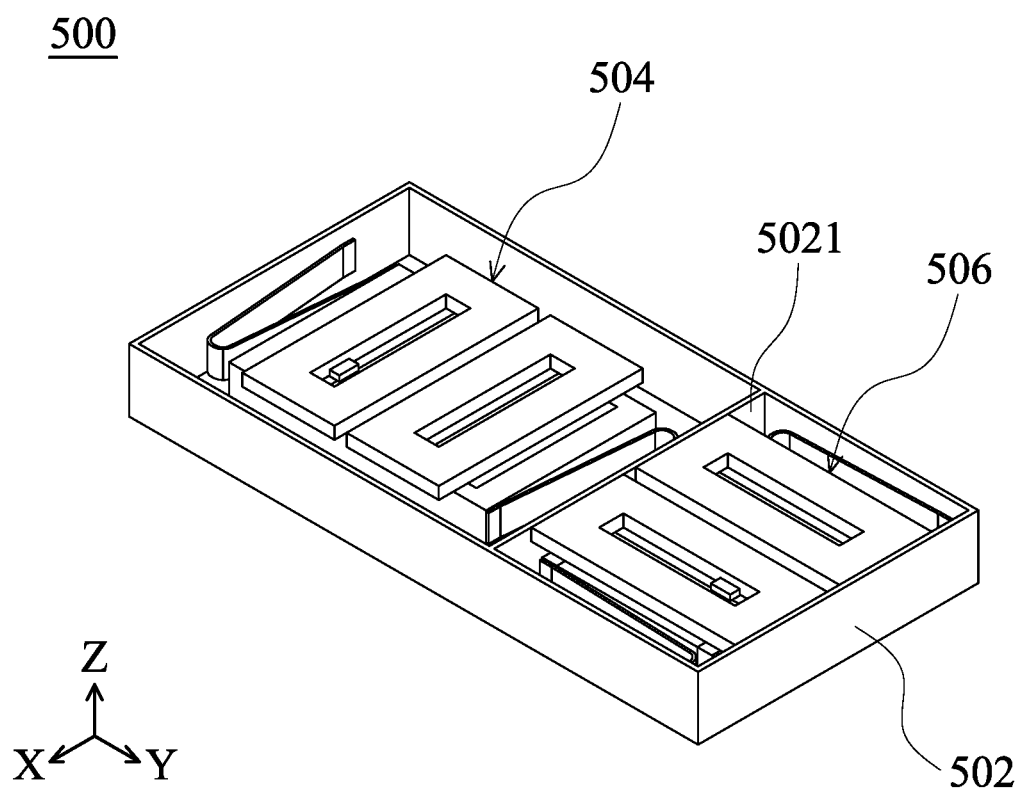
FIG. 13 is a diagram of a vibration device according to another embodiment of the disclosure.
Figure 14:
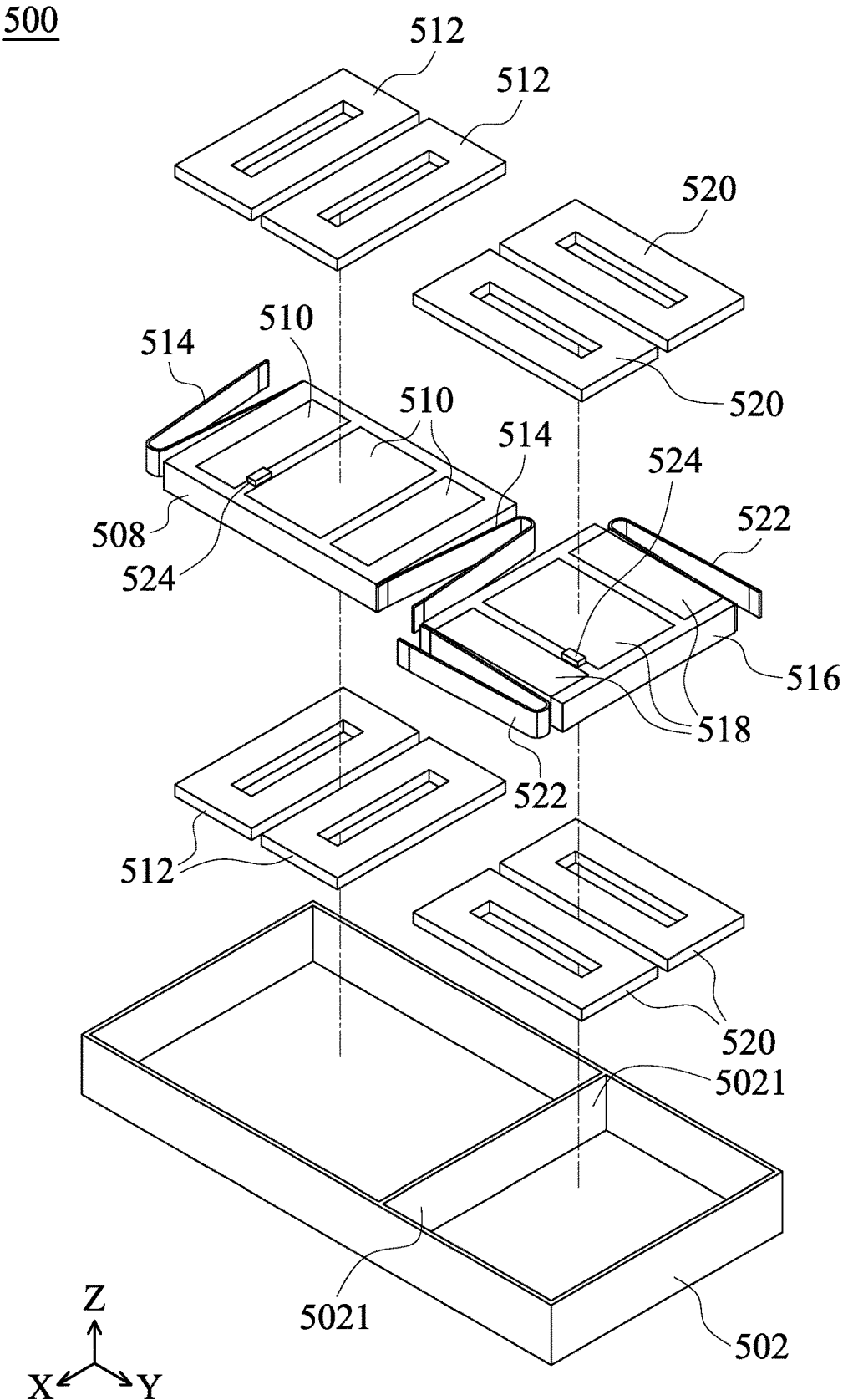
FIG. 14 is an exploded diagram of the vibration device in FIG. 13.

Please refer to FIG. 13 and FIG. 14. FIG. 13 is a diagram of a vibration device 500 according to another embodiment of the disclosure, and FIG. 14 is an exploded diagram of the vibration device 500 in FIG. 13. As shown in FIG. 13, the vibration device 500 includes a fixed portion 502, a first vibration module 504 and a second vibration module 506. In this embodiment, the fixed portion 502 includes a separating plate 5021, and the first vibration module 504 and the second vibration module 506 are disposed inside the fixed portion 502 and are located on two sides of the separating plate 5021. In this embodiment, the first vibration module 504 is configured to generate a vibration along the Y-axis (the first axial direction), and the second vibration module 506 is configured to generate a vibration along the X-axis (a second axial direction). The first axial direction is not parallel to the second axial direction. For example, the first axial direction can be substantially perpendicular to the second axial direction.

As shown in FIG. 14, the first vibration module 504 includes a first movable member 508, three first magnetic elements 510, four first induction coils 512 and two first resilient elements 514. In this embodiment, the three first magnetic elements 510 are disposed in the first movable member 508, and the four first induction coils 512 corresponding to the first magnetic elements 510 are disposed on two sides of the first movable member 508 along the Z-axis. Two first induction coils 512 are securely disposed in the fixed portion 502, and the other two first induction coils 512 are securely disposed on a cover of the fixed portion 502 (the cover is not shown in the figures). The two first resilient elements 514 are respectively disposed on two sides of the first movable member 508 along the Y-axis, so as to suspend the first movable member 508 in the fixed portion 502.

In addition, the second vibration module 506 includes a second movable member 516, three second magnetic elements 518, four second induction coils 520 and two second resilient elements 522. In this embodiment, the three second magnetic elements 518 are disposed in the second movable member 516, and the four second induction coils 520 corresponding to the second magnetic elements 518 are disposed on two sides of the second movable member 516 along the Z-axis. Two second induction coils 520 are securely disposed in the fixed portion 502, and the other two second induction coils 520 are securely disposed on the cover (the cover is not shown in the figures). The two second resilient elements 522 are respectively disposed on two sides of the second movable member 516 along the Y-axis, and the second resilient elements 522 are configured to suspend the second movable member 516 in the fixed portion 502.

Similar to the previous embodiment, when the first induction coils 512 are supplied with electricity, the first induction coils 512 act with the first magnetic elements 510 to generate the electromagnetic force, so as to drive the first movable member 508 to move along the Y-axis, so that the vibration device 500 generates a vibration along the Y-axis. When the second induction coils 520 are supplied with electricity, the second induction coils 520 act with the second magnetic elements 518 to generate the electromagnetic force, so as to drive the second movable member 516 to move along the X-axis, so that the vibration device 500 generates a vibration along the X-axis. It should be noted that the first vibration module 504 and the second vibration module 506 can generate the vibrations at the same time, or can separately generate the vibrations.

Furthermore, the vibration device 500 can further include at least one sensing element 524, disposed on the first movable member 508 or on the second movable member 516, and the sensing element 524 is configured to sense the movement of the first movable member 508 or the second movable member 516. In this embodiment, the vibration device 500 includes two sensing elements 524, respectively disposed on the first movable member 508 and the second movable member 516.

Based on the design of the first vibration module 504 and the second vibration module 506 in this embodiment, the vibration device 500 can provides vibrations in two directions. In addition, in another embodiment, the separating plate 5021 in FIG. 14 can be omitted in the fixed portion 502, and the first resilient element 514 between the first movable member 508 and the second movable member 516 can be directly connected to the second movable member 516.

Figure 15:
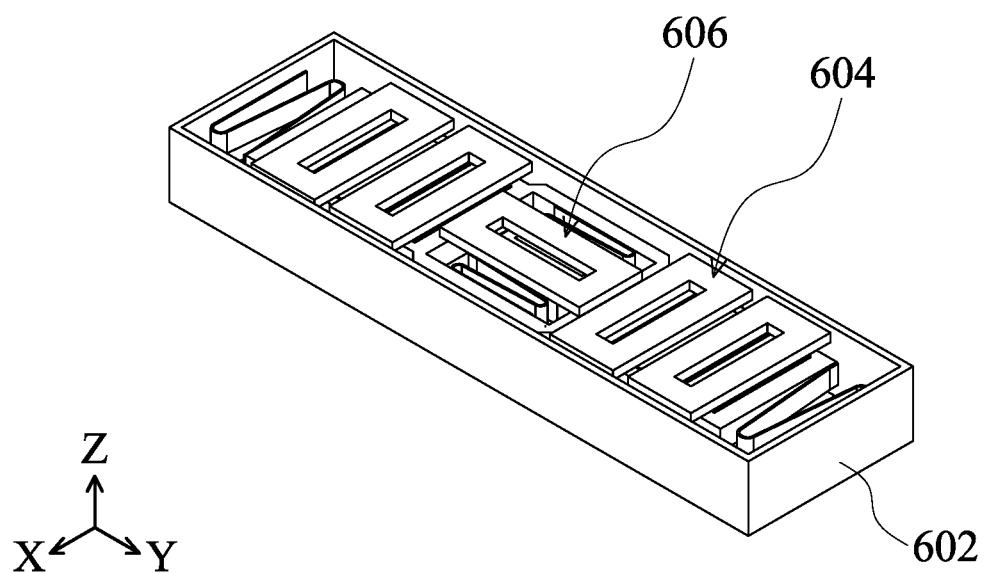
FIG. 15 is a diagram of a vibration device according to another embodiment of the disclosure.
Figure 16:
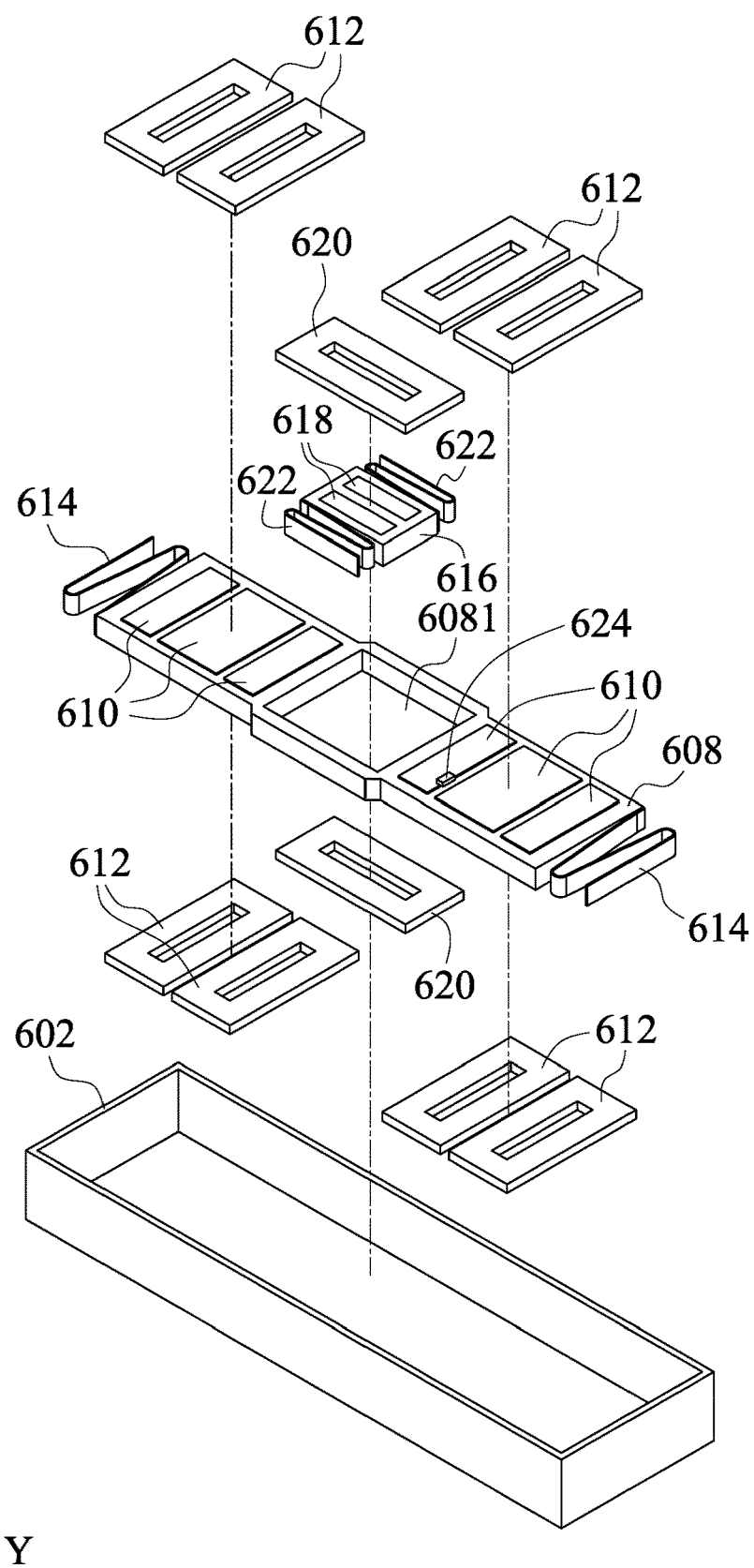
FIG. 16 is an exploded diagram of the vibration device in FIG. 15.

Next, please refer to FIG. 15 and FIG. 16. FIG. 15 is a diagram of a vibration device 600 according to another embodiment of the disclosure. FIG. 16 is an exploded diagram of the vibration device 600 in FIG. 15. As shown in FIG. 15, the vibration device 600 includes a fixed portion 602, a first vibration module 604 and a second vibration module 606. In this embodiment, the first vibration module 604 and the second vibration module 606 are disposed inside the fixed portion 602. In this embodiment, the first vibration module 604 is configured to generate a vibration along the Y-axis (the first axial direction), and the second vibration module 606 is configured to generate a vibration along the X-axis (the second axial direction). The first axial direction is not parallel to the second axial direction.

As shown in FIG. 16, the first vibration module 604 includes a first movable member 608, six first magnetic elements 610, eight first induction coils 612 and two first resilient elements 614. In this embodiment, three first magnetic elements 610 are disposed on one side of the first movable member 608, and the other three first magnetic elements 610 are disposed on the other side of the first movable member 608. The eight first induction coils 612 corresponding to the first magnetic elements 610 are disposed on two sides of the first movable member 608 along the Z-axis. Four first induction coils 612 are securely disposed in the fixed portion 602, and the other four first induction coils 612 are securely disposed on a cover of the fixed portion 602 (the cover is not shown in the figures). The two first resilient elements 614 are respectively disposed on two sides of the first movable member 608 along the Y-axis, so as to suspend the first movable member 608 in the fixed portion 602. It should be noted that a first opening 6081 is formed on a central position of the first movable member 608, and the first opening 6081 is configured to accommodate the second vibration module 606.

In this embodiment, the second vibration module 606 includes a second movable member 616, two second magnetic elements 618, two second induction coils 620 and two second resilient elements 622. In this embodiment, two second magnetic elements 618 are disposed in the second movable member 616, and the two second induction coils 620 corresponding to the second magnetic elements 618 are disposed on two sides of the second movable member 616 along the Z-axis. One second induction coil 620 is securely disposed in the fixed portion 602, and the other one second induction coil 620 is securely disposed on the cover (the cover is not shown in the figures). It should be noted that the two second resilient elements 622 are respectively disposed on two sides of the second movable member 616 along the X-axis, and the second resilient elements 622 are configured to suspend the second movable member 616 in the first opening 6081 of the first movable member 608.

When the first induction coils 612 are supplied with electricity, the first induction coils 612 act with the first magnetic elements 610 to generate the electromagnetic force, so as to drive the first movable member 608 to move along the Y-axis, so that the vibration device 600 generates a vibration along the Y-axis. When the second induction coils 620 are supplied with electricity, the second induction coils 620 act with the second magnetic elements 618 to generate the electromagnetic force, so as to drive the second movable member 616 to move along the X-axis, so that the vibration device 600 generates a vibration along the X-axis. Similarly, the first vibration module 604 and the second vibration module 606 can generate the vibrations at the same time, or can separately generate the vibrations.

Furthermore, the vibration device 600 can further include at least one sensing element 624, disposed on the first movable member 608 or on the second movable member 616, and the sensing element 624 is configured to sense the movement of the first movable member 608 or the second movable member 616. In this embodiment, the vibration device 600 includes one sensing element 624, disposed on the first movable member 608 and located between two adjacent first magnetic elements 610.

The vibration device 600 in this embodiment provides the vibrations in two directions, and the second vibration module 606 is disposed in the first opening 6081 of the first movable member 608, so that the length of the vibration device 600 along the Y-axis can be further decreased, so as to achieve the purpose of miniaturization.

Figure 17:
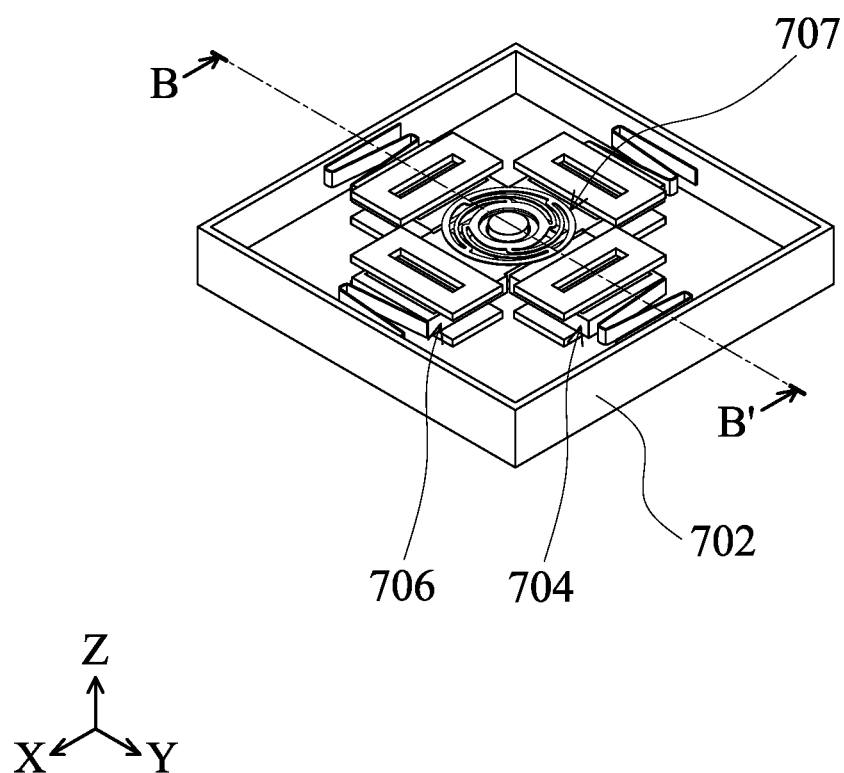
FIG. 17 is a diagram of a vibration device according to another embodiment of the disclosure.
Figure 18:
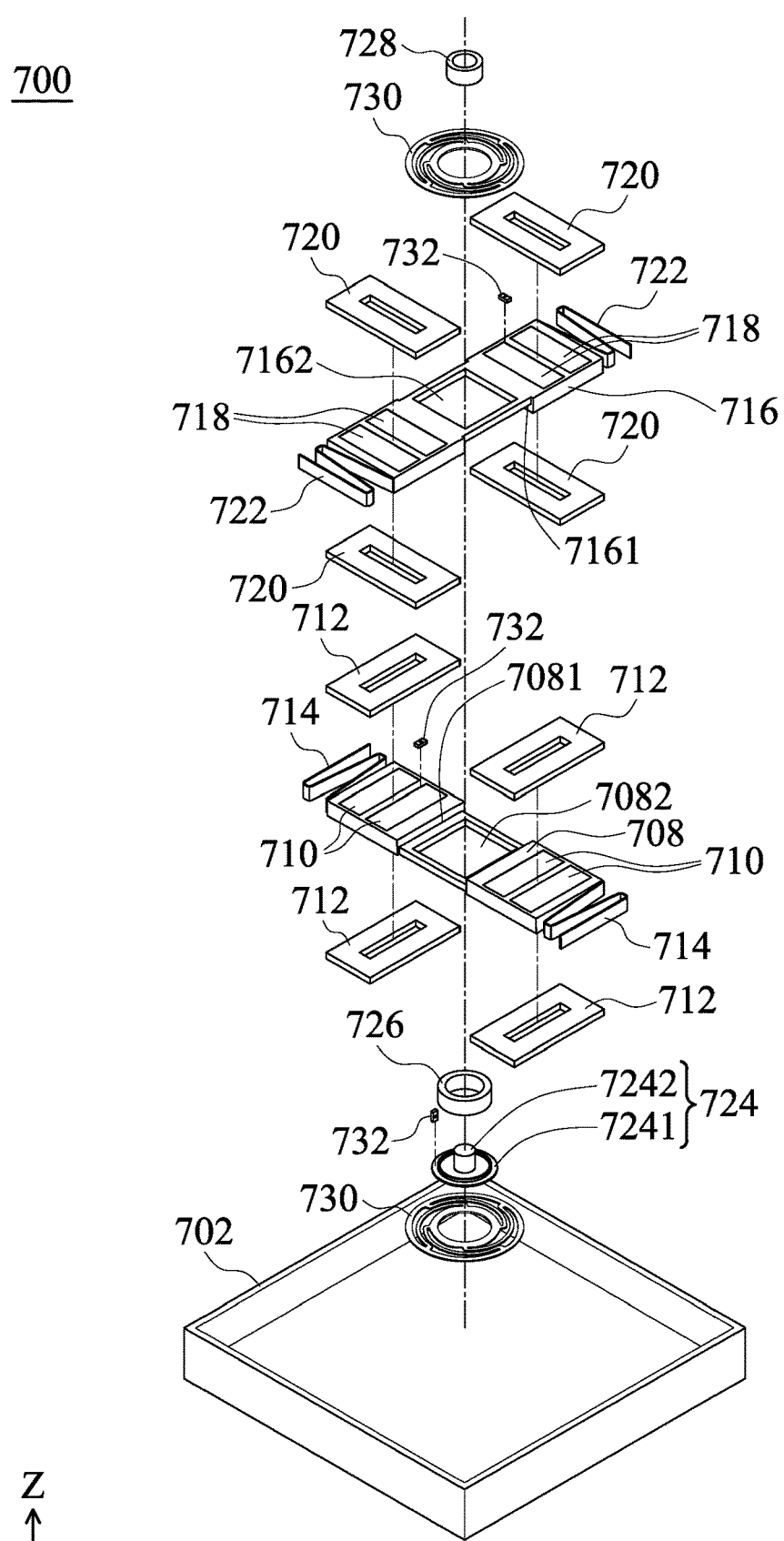
FIG. 18 is an exploded diagram of the vibration device in FIG. 17.

Please refer to FIG. 17 and FIG. 18. FIG. 17 is a diagram of a vibration device 700 according to another embodiment of the disclosure. FIG. 18 is an exploded diagram of the vibration device 700 in FIG. 17. As shown in FIG. 17, the vibration device 700 includes a fixed portion 702, a first vibration module 704, a second vibration module 706 and a third vibration module 707. In this embodiment, the first vibration module 704 is configured to generate a vibration along the Y-axis (the first axial direction), the second vibration module 706 is configured to generate a vibration along the X-axis (the second axial direction), and the third vibration module 707 is configured to generate a vibration along the Z-axis (the third axial direction).

As shown in FIG. 18, the first vibration module 704 includes a first movable member 708, four first magnetic elements 710, four first induction coils 712 and two first resilient elements 714. In this embodiment, four first magnetic elements 710 are disposed in the first movable member 708, and the four first induction coils 712 corresponding to the first magnetic elements 710 are disposed on two sides of the first movable member 708 along the Z-axis. Two first induction coils 712 are securely disposed in the fixed portion 702, and the other two first induction coils 712 are securely disposed on a cover of the fixed portion 702 (the cover is not shown in the figures). The two first resilient elements 714 are respectively disposed on two sides of the first movable member 708 along the Y-axis, so as to suspend the first movable member 708 in the fixed portion 702.

In addition, the second vibration module 706 includes a second movable member 716, four second magnetic elements 718, four second induction coils 720 and two second resilient elements 722. In this embodiment, the four second magnetic elements 718 are disposed in the second movable member 716, and the four second induction coils 720 corresponding to the second magnetic elements 718 are disposed on two sides of the second movable member 716 along the Z-axis. Two second induction coils 720 are securely disposed in the fixed portion 702, and the other two second induction coils 720 are securely disposed on the cover (the cover is not shown in the figures). The two second resilient elements 722 are respectively disposed on two sides of the second movable member 716 along the X-axis, and the second resilient elements 722 are configured to suspend the second movable member 716 in the fixed portion 702.

It should be noted that the first movable member 708 includes a first slot 7081, and the second movable member 716 includes a second slot 7161. The first slot 7081 is configured to face the second slot 7161 and is substantially align with the second slot 7161, and the first movable member 708 and the second movable member 716 are arranged along the Z-axis (the third axial direction). In this embodiment, the third axial direction can be perpendicular to the first axial direction or the second axial direction. In addition, the first movable member 708 further includes a first opening 7082, the second movable member 716 further includes a second opening 7162, and the third vibration module 707 can be disposed in the first opening 7082 and the second opening 7162.

Figure 19:
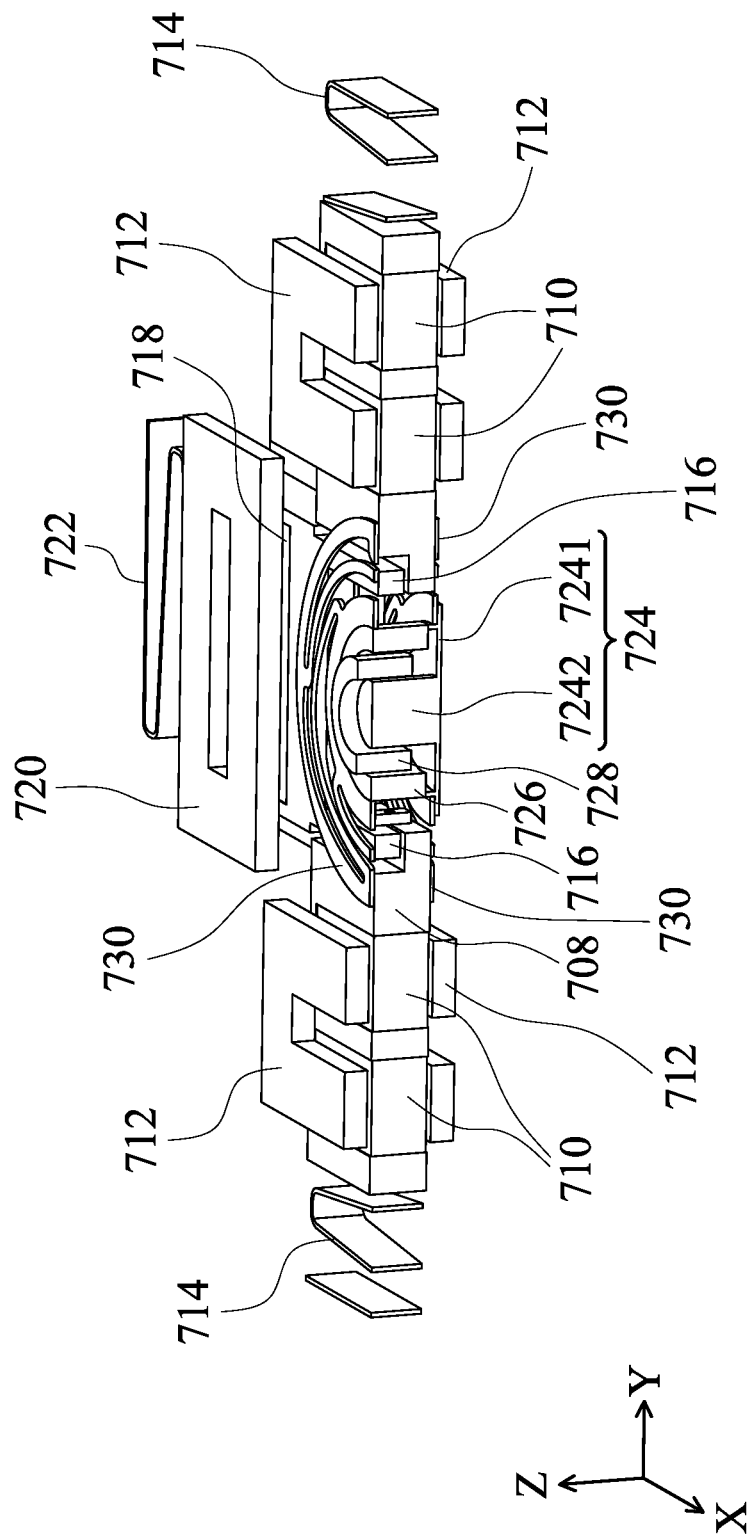
FIG. 19 is a perspective cross-sectional view of the vibration device along the line B-B' in FIG. 17.

Please refer to FIG. 18 and FIG. 19. FIG. 19 is a perspective cross-sectional view of the vibration device 700 along the line B-B' in FIG. 17 according to the embodiment of the disclosure. As shown in FIG. 18, the third vibration module 707 includes a third movable member 724, a third magnetic element 726, a third induction coil 728 and two third resilient elements 730. In this embodiment, the third movable member 724 includes a bottom portion 7241 and a protruding portion 7242, the third induction coil 728 is fixed to the cover (not shown in the figures), and the third induction coil 728 has a ring structure which surrounds the protruding portion 7242 and is not in contact with the protruding portion 7242. The third magnetic element 726 has a ring structure which surrounds the third induction coil 728, and the third magnetic element 726 is securely disposed on the third movable member 724. One of the third resilient elements 730 (such as the lower third resilient elements 730 in FIG. 18) is disposed between the fixed portion 702 and the third movable member 724, and is configured to connect the fixed portion 702 with the bottom portion 7241 of the third movable member 724. More specifically, an inner ring portion of the third resilient elements 730 is connected to the bottom portion 7241 of the third movable member 724, and an outer ring portion of the third resilient elements 730 is connected to the fixed portion 702. Furthermore, the other third resilient elements 730 (such as the upper third resilient elements 730 in FIG. 18) is disposed between the cover (not shown in the figures) and the third magnetic element 726. The third magnetic element 726 is connected to an inner ring portion of the third resilient elements 730, and an outer ring portion of the third resilient elements 730 is connected to the cover (not shown in the figures). It should be noted that the first movable member 708 is suspended in the fixed portion 702, and the second movable member 716 is suspended in the fixed portion 702 and is not in contact with the first movable member 708 as shown in FIG. 19. Moreover, the third movable member 724 is not in contact with the first movable member 708 or the second movable member 716.

When the first induction coils 712 are supplied with electricity, the first induction coils 712 act with the first magnetic elements 710 to generate the electromagnetic force, so as to drive the first movable member 708 to move along the Y-axis, so that the vibration device 700 generates a vibration along the Y-axis. When the second induction coils 720 are supplied with electricity, the second induction coils 720 act with the second magnetic elements 718 to generate the electromagnetic force, so as to drive the second movable member 716 to move along the X-axis, so that the vibration device 700 generates a vibration along the X-axis. When the third induction coil 728 is supplied with electricity, the third induction coil 728 acts with the third magnetic element 726 to generate the electromagnetic force, so that the third magnetic element 726 drives the third movable member 724 to move along the Z-axis. As a result, the vibration device 700 generates a vibration along the Z-axis. The first vibration module 704, the second vibration module 706 and the third vibration module 707 can generate the vibrations at the same time, or can separately generate the vibrations. In addition, as shown in FIG. 18, the vibration device 700 can include three sensing elements 732, respectively disposed on the first movable member 708, the second movable member 716 and the third movable member 724. The sensing elements 732 are configured to sense the movement of the first movable member 708, the second movable member 716 and the third movable member 724.

Figure 20:
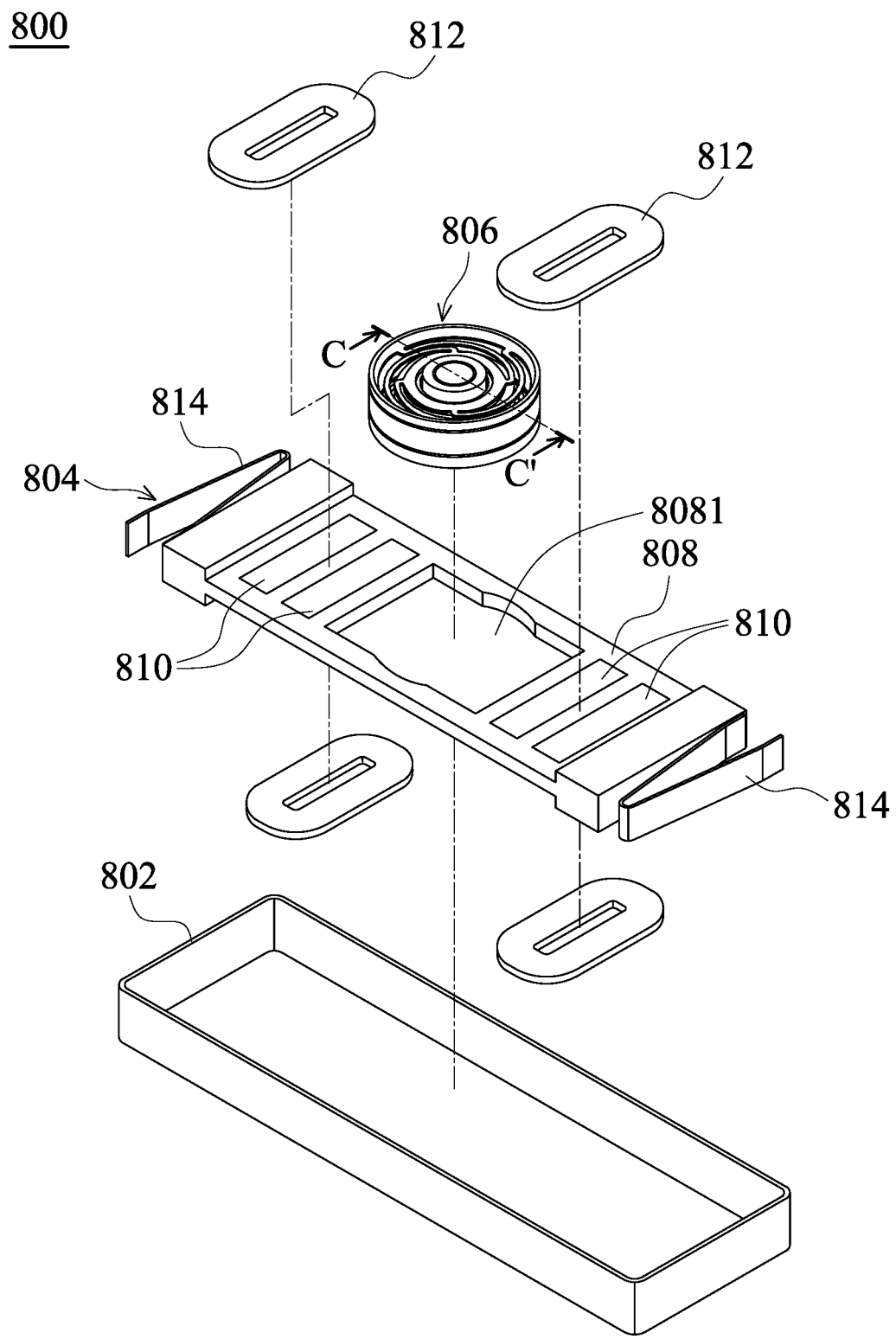
FIG. 20 is a diagram of a vibration device according to another embodiment of the disclosure.
Figure 21:
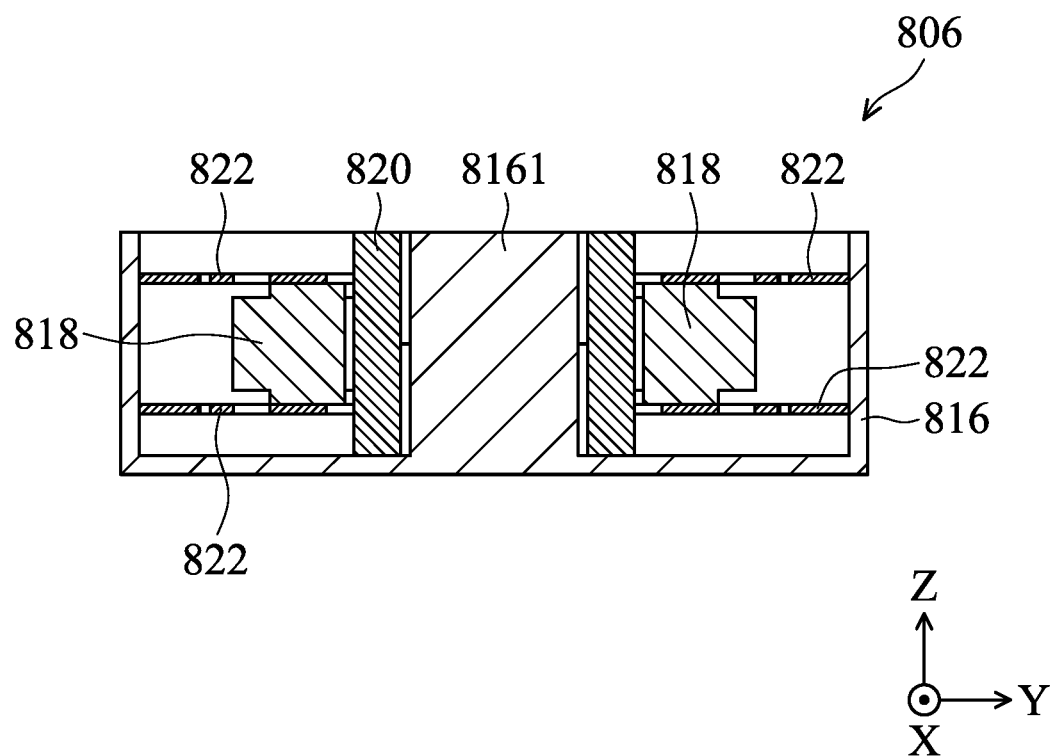
FIG. 21 is a sectional view along the line C-C' in FIG. 20.

Please refer to FIG. 20 and FIG. 21. FIG. 20 is a diagram of a vibration device 800 according to another embodiment of the disclosure, and FIG. 21 is a sectional view along the line C-C' in FIG. 20. As shown in FIG. 20, the vibration device 800 includes a fixed portion 802, a first vibration module 804 and a second vibration module 806, and the first vibration module 804 includes a first movable member 808, four first magnetic elements 810, four first induction coils 812 and two first resilient elements 814. Positions and relative relationship of each element of the first vibration module 804 is similar to the first vibration module 604 in FIG. 15, and is omitted herein. Specifically, the first movable member 808 includes an opening 8081, and the second vibration module 806 is engaged in the opening 8081.

As shown in FIG. 21, the second vibration module 806 includes a base 816, a second magnetic element 818, a second induction coil 820 and two second resilient elements 822. In this embodiment, the base 816 includes a protruding portion 8161, and the second induction coil 820 sheathes on the protruding portion 8161. The two second resilient elements 822 suspend the second magnetic element 818 in the base 816. The second magnetic element 818 has a ring structure and movably surrounds the second induction coil 820.

When the first induction coils 812 are supplied with electricity, the first induction coils 812 act with the first magnetic elements 810 to generate the electromagnetic force, so as to drive the first movable member 808 to move along the Y-axis, so that the vibration device 800 generates a vibration along the Y-axis. When the second induction coil 820 is supplied with electricity, the second induction coil 820 acts with the second magnetic element 818 to generate the electromagnetic force, so as to drive the second magnetic element 818 to move along the Z-axis, so that the vibration device 800 generates a vibration along the Z-axis. Similarly, the first vibration module 804 and the second vibration module 806 can generate the vibrations at the same time, or can separately generate the vibrations. In addition, the vibration device 800 can also include two sensing elements (not shown in the figures) respectively disposed on the first movable member 808 and the base 816, and the sensing elements are configured to sense the movement of the first movable member 808 and the base 816.

In conclusion, the present disclosure provides a vibration device that includes a stator, an eccentric wheel and an electromagnetic driving assembly. Because the eccentric wheel and the electromagnetic driving assembly are disposed in the stator and on the same plane, the thickness of the vibration device can be decreased, so as to achieve the purpose of miniaturization. In some embodiments, the present disclosure further provides a vibration device which can generate a vibration in single direction, generate vibrations in two directions generated independently or simultaneously, and generate vibrations in three directions, so that when the vibration device of the disclosure is installed in an electronic device (such as a smartphone or a tablet computer), a user can be notified of different messages by the different vibrations.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A tactile feedback mechanism, comprising:
a fixed portion;
a first movable portion, moving relative to the fixed portion;
a first driving assembly, driving the first movable portion to move relative to the fixed portion;
a second movable portion, moving relative to the fixed portion and the first movable portion;
a second driving assembly, driving the second movable portion to move relative to the fixed portion;
a first resilient element, connected the fixed portion and the first movable portion; and
a second resilient element, connected the first movable portion and the second movable portion,
wherein the second movable portion is moved relative to the fixed portion when the first movable portion is driven to move relative to the fixed portion.

2. The tactile feedback mechanism as claimed in claim 1, further comprising another first resilient element, wherein the two first resilient elements are connected to opposite sides of the first movable portion, and the two first resilient elements are disposed along a first direction.

3. The tactile feedback mechanism as claimed in claim 1, further comprising another second resilient element, wherein the two second resilient elements are connected to opposite sides of the second movable portion, and the two second resilient elements are disposed along a second direction.

4. The tactile feedback mechanism as claimed in claim 1, wherein the first driving assembly comprises:
a first magnetic element; and
a first induction coil, corresponding to the first magnetic element, wherein the first induction coil acts with the first magnetic element to drive the first movable portion to move along a first direction.

5. The tactile feedback mechanism as claimed in claim 4, wherein a winding axis of the first induction coil is perpendicular to the first direction.

6. The tactile feedback mechanism as claimed in claim 4, wherein the first driving assembly further comprises other five first magnetic elements, and the six first magnetic elements are arranged in the first direction, three of the six first magnetic elements are disposed on a side of the first movable portion, other three of the six first magnetic elements are disposed on an opposite side of the first movable portion.

7. The tactile feedback mechanism as claimed in claim 4, wherein the first driving assembly further comprises other seven first induction coils, and four of the eight first induction coils are disposed on an upper side of the fixed portion, other four of the eight first induction coils are disposed on a lower side of the fixed portion.

8. The tactile feedback mechanism as claimed in claim 4, wherein the second movable portion is moved along the first direction when the first induction coil acts with the first magnetic element to drive the first movable portion to move along the first direction.

9. The tactile feedback mechanism as claimed in claim 4, wherein the second driving assembly comprises:
   a second magnetic element; and
   a second induction coil, corresponding to the second magnetic element, wherein the second induction coil acts with the second magnetic element to drive the second movable portion to move along a second direction.

10. The tactile feedback mechanism as claimed in claim 9, wherein a winding axis of the second induction coil is perpendicular to the first direction and the second direction.

11. A tactile feedback mechanism, comprising:
   a fixed portion;
   a first movable portion, moving relative to the fixed portion;
   a first driving assembly, driving the first movable portion to move relative to the fixed portion;
   a second movable portion, moving relative to the fixed portion and the first movable portion; and
   a second driving assembly, driving the second movable portion to move relative to the fixed portion,
   wherein the second movable portion is moved relative to the fixed portion when the first movable portion is driven to move relative to the fixed portion,
   wherein the first driving assembly comprises:
      a first magnetic element; and
      a first induction coil, corresponding to the first magnetic element, wherein the first induction coil acts with the first magnetic element to drive the first movable portion to move along a first direction,
   wherein the second driving assembly comprises:
      a second magnetic element; and
      a second induction coil, corresponding to the second magnetic element, wherein the second induction coil acts with the second magnetic element to drive the second movable portion to move along a second direction,
   wherein the second driving assembly further comprises another magnetic element, and the two second magnetic elements are arranged in the second direction.

12. The tactile feedback mechanism as claimed in claim 9, wherein the second driving assembly further comprises another second induction coil, and one of the two second induction coils are disposed on the upper side of the fixed portion, the other one of the two second induction coils are disposed on the lower side of the fixed portion.

13. The tactile feedback mechanism as claimed in claim 9, wherein the first movable portion is moved along the second direction when the second induction coil acts with the second magnetic element to drive the second movable portion to move along the second direction.

14. The tactile feedback mechanism as claimed in claim 9, wherein the first movable portion is driven to move along the first direction by the first driving assembly, and is moved along the second direction when the second induction coil acts with the second magnetic element to drive the second movable portion to move along the second direction.

15. A tactile feedback mechanism, comprising:
   a fixed portion;
   a first movable portion, moving relative to the fixed portion;
   a first driving assembly, driving the first movable portion to move relative to the fixed portion;
   a second movable portion, moving relative to the fixed portion and the first movable portion; and
   a second driving assembly, driving the second movable portion to move relative to the fixed portion,
   wherein the second movable portion is moved relative to the fixed portion when the first movable portion is driven to move relative to the fixed portion,
   wherein the first driving assembly comprises:
      a first magnetic element; and
      a first induction coil, corresponding to the first magnetic element, wherein the first induction coil acts with the first magnetic element to drive the first movable portion to move along a first direction,
   wherein the second driving assembly comprises:
      a second magnetic element; and
      a second induction coil, corresponding to the second magnetic element, wherein the second induction coil acts with the second magnetic element to drive the second movable portion to move along a second direction,
   wherein when viewed in the first direction, the first magnetic element and the second magnetic element at least partially overlap, and the first induction coil and the second induction coil at least partially overlap.

16. The tactile feedback mechanism as claimed in claim 9, wherein when viewed in the second direction, the first magnetic element and the second magnetic element do not overlap, and the first induction coil and the second induction coil do not overlap.

17. A tactile feedback mechanism, comprising:
   a fixed portion;
   a first movable portion, moving relative to the fixed portion;
   a first driving assembly, driving the first movable portion to move relative to the fixed portion;
   a second movable portion, moving relative to the fixed portion and the first movable portion;
   a second driving assembly, driving the second movable portion to move relative to the fixed portion, and
   a sensing element, disposed on the first movable portion and configured to sense the movement of the first movable portion,
   wherein the second movable portion is moved relative to the fixed portion when the first movable portion is driven to move relative to the fixed portion,
   wherein the first driving assembly comprises:
      a first magnetic element; and
      a first induction coil, corresponding to the first magnetic element, wherein the first induction coil acts with the first magnetic element to drive the first movable portion to move along a first direction,
   wherein the second driving assembly comprises:
      a second magnetic element; and
      a second induction coil, corresponding to the second magnetic element, wherein the second induction coil acts with the second magnetic element to drive the second movable portion to move along a second direction.

18. The tactile feedback mechanism as claimed in claim 17, wherein the first driving assembly further comprises another magnetic element, the two first magnetic elements are arranged in the first direction, and the sensing element is located between the two first magnetic elements.

19. The tactile feedback mechanism as claimed in claim 1, wherein a first opening is formed on the first movable portion, and the second movable portion is disposed in the first opening.

* * * * *